(12) United States Patent
Wiwi

(10) Patent No.: US 10,478,871 B2
(45) Date of Patent: Nov. 19, 2019

(54) SIDE-OPENING SLEEVE VALVE

(71) Applicant: Lawrence Anthony Wiwi, West Harrison, IN (US)

(72) Inventor: Lawrence Anthony Wiwi, West Harrison, IN (US)

( * ) Notice: Subject to any disclaimer, the term of this patent is extended or adjusted under 35 U.S.C. 154(b) by 0 days.

(21) Appl. No.: 15/840,114

(22) Filed: Dec. 13, 2017

(65) Prior Publication Data

US 2018/0099318 A1  Apr. 12, 2018

Related U.S. Application Data

(63) Continuation-in-part of application No. PCT/US2017/031647, filed on May 9, 2017, and a
(Continued)

(51) Int. Cl.
| | |
|---|---|
| *E03D 5/012* | (2006.01) |
| *E03D 11/02* | (2006.01) |
| *E03D 11/10* | (2006.01) |
| *F16K 3/02* | (2006.01) |
| *F16K 11/07* | (2006.01) |
| *F16K 11/085* | (2006.01) |
| *B08B 9/053* | (2006.01) |
| *B08B 9/055* | (2006.01) |
| *E03D 3/10* | (2006.01) |
| *E03F 9/00* | (2006.01) |
| *F16L 55/46* | (2006.01) |
| *E03D 5/016* | (2006.01) |

(52) U.S. Cl.
CPC .............. *B08B 9/053* (2013.01); *B08B 9/055* (2013.01); *E03D 3/10* (2013.01); *E03D 5/012* (2013.01); *E03D 11/02* (2013.01); *E03D 11/10* (2013.01); *E03F 9/007* (2013.01); *F16K 3/0281* (2013.01); *F16K 11/0716* (2013.01); *F16K 11/085* (2013.01); *F16L 55/46* (2013.01); *E03D 5/016* (2013.01)

(58) Field of Classification Search
CPC ....... F16K 11/0716; F16K 31/30; E02B 13/02
USPC ....................................... 4/449; 251/343–345
See application file for complete search history.

(56) References Cited

U.S. PATENT DOCUMENTS

| | | |
|---|---|---|
| 202,519 A | 4/1878 | Chapin |
| 354,503 A | 12/1886 | Cross |
| (Continued) | | |

*Primary Examiner* — Christine J Skubinna
(74) *Attorney, Agent, or Firm* — Daniel F. Nesbitt; Hasse & Nesbitt LLC

(57) ABSTRACT

A side-opening sleeve valve having an inner barrel with a shaped opening through its cylindrical wall having a longer size along the axis of the inner barrel, and a co-annular outer barrel having shaped opening through its cylindrical wall having a longer size along the axis of the outer barrel. The inner barrel is rotatable relative to the outer barrel between a first open position where the shaped openings overlap to form a side opening into the sleeve valve, and a second closed position where the shaped openings do not overlap. The side opening has an effective axial opening size and an effective lateral opening size in a ratio of at least about 2:1. The side-opening valve is useful with water-less toilet that can empty into the side-opening valve when opened, and when closed, a pigging fluid flush system pushes the waste in the side-opening valve to a sewage system.

18 Claims, 15 Drawing Sheets

Related U.S. Application Data continuation-in-part of application No. 15/244,597, filed on Aug. 23, 2016, now Pat. No. 9,845,592, which is a continuation of application No. 15/207,726, filed on Jul. 12, 2016, now abandoned.

(60) Provisional application No. 62/333,327, filed on May 9, 2016.

(56) References Cited

U.S. PATENT DOCUMENTS

| | | | |
|---|---|---|---|
| 2,276,109 A | 3/1942 | Smith | |
| 3,353,785 A * | 11/1967 | Eggers | F16K 5/045 251/175 |
| 3,538,517 A | 11/1970 | Cornish et al. | |
| 3,543,323 A | 12/1970 | Girard | |
| 3,686,693 A | 8/1972 | Liljendahl | |
| 3,720,962 A | 3/1973 | Harrah | |
| 4,050,102 A | 9/1977 | Kemper et al. | |
| 4,232,409 A | 11/1980 | Van Pham | |
| 4,297,751 A | 11/1981 | Olin et al. | |
| 4,387,750 A | 6/1983 | McNerney | |
| 4,413,370 A | 11/1983 | Payne et al. | |
| 4,974,264 A | 12/1990 | Brian | |
| 5,123,124 A | 6/1992 | Brower | |
| 5,133,853 A | 7/1992 | Mattsson | |
| 5,165,457 A | 11/1992 | Olin et al. | |
| 5,193,572 A | 3/1993 | LeDevehat | |
| 5,396,668 A * | 3/1995 | Haatanen | E03F 1/006 4/321 |
| 6,006,766 A | 12/1999 | Soulages | |
| 6,176,938 B1 | 1/2001 | Palmer | |
| 6,216,285 B1 | 4/2001 | Olin | |
| 6,487,731 B1 | 12/2002 | Houde | |
| 6,569,255 B2 | 5/2003 | Sivacoe | |
| 6,869,063 B2 | 3/2005 | Gunnarsson et al. | |
| 2006/0108011 A1 * | 5/2006 | George | F16K 11/0856 137/625.21 |
| 2007/0102370 A1 | 5/2007 | Hoffjann et al. | |
| 2008/0298907 A1 | 12/2008 | Scott | |
| 2012/0227173 A1 | 9/2012 | Kaikov | |
| 2016/0138236 A1 * | 5/2016 | Cocciardi | E02B 13/02 137/423 |

* cited by examiner

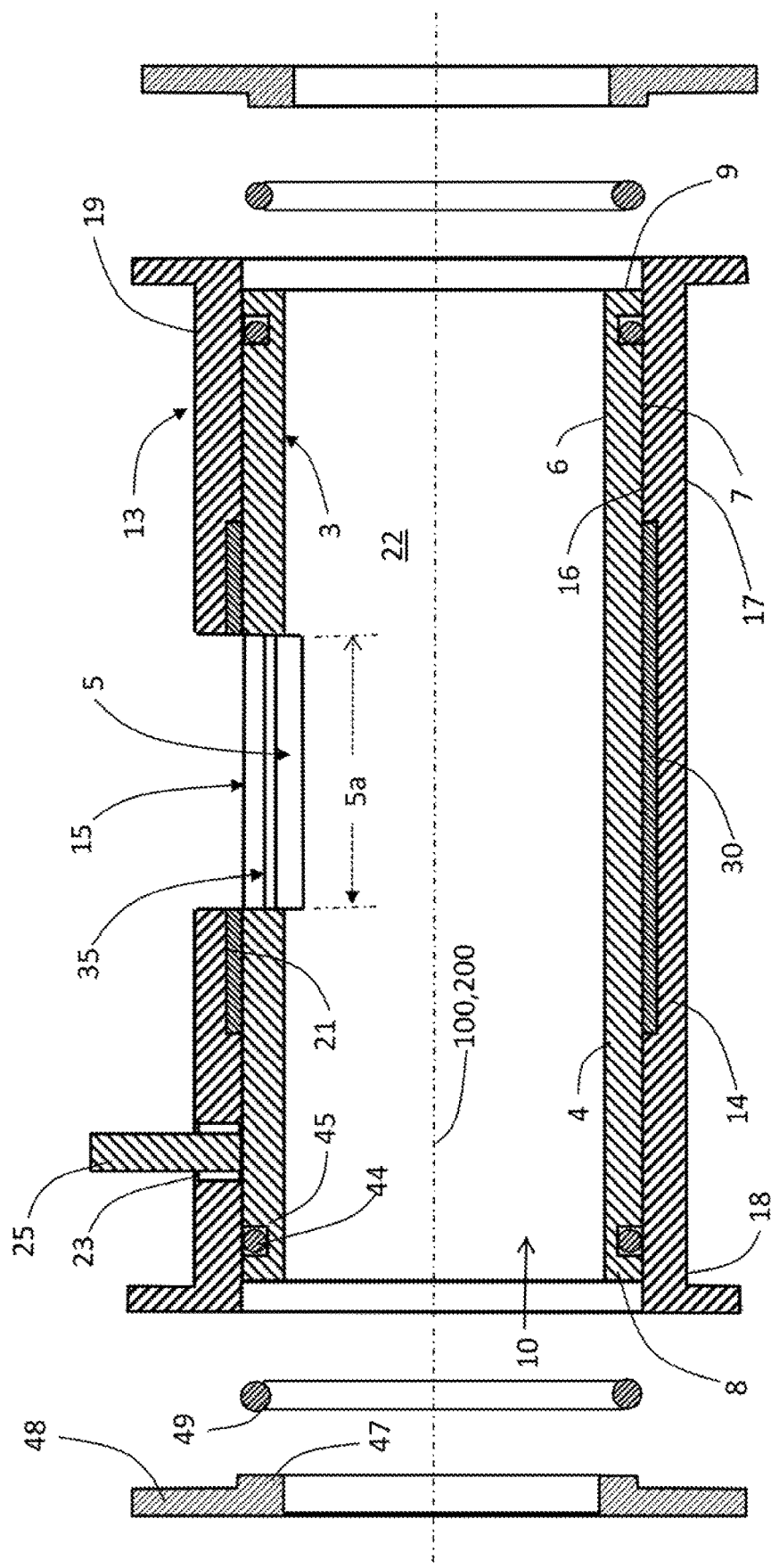

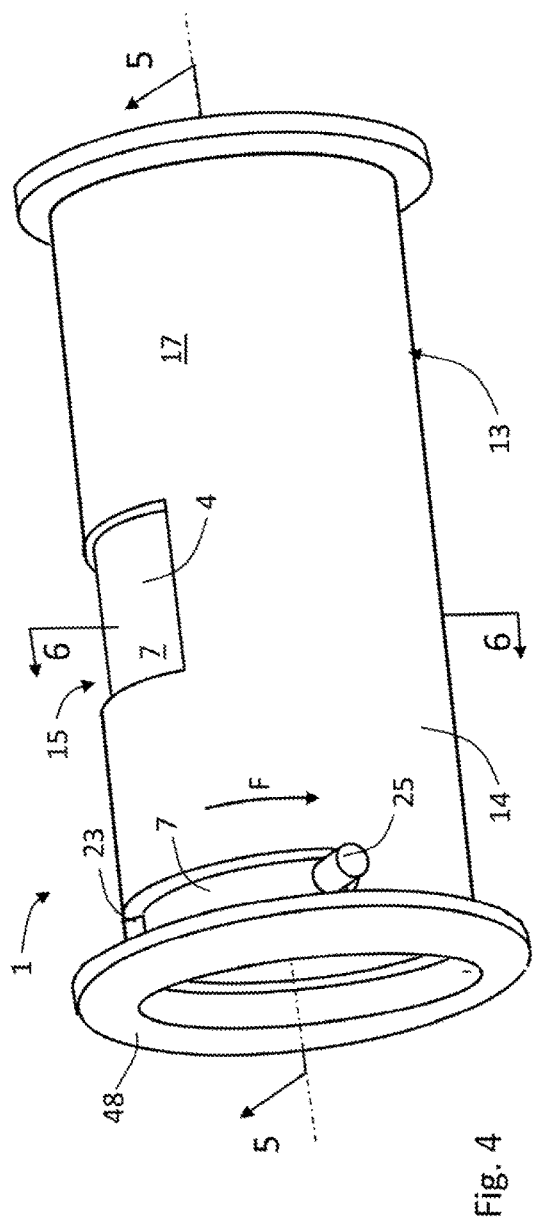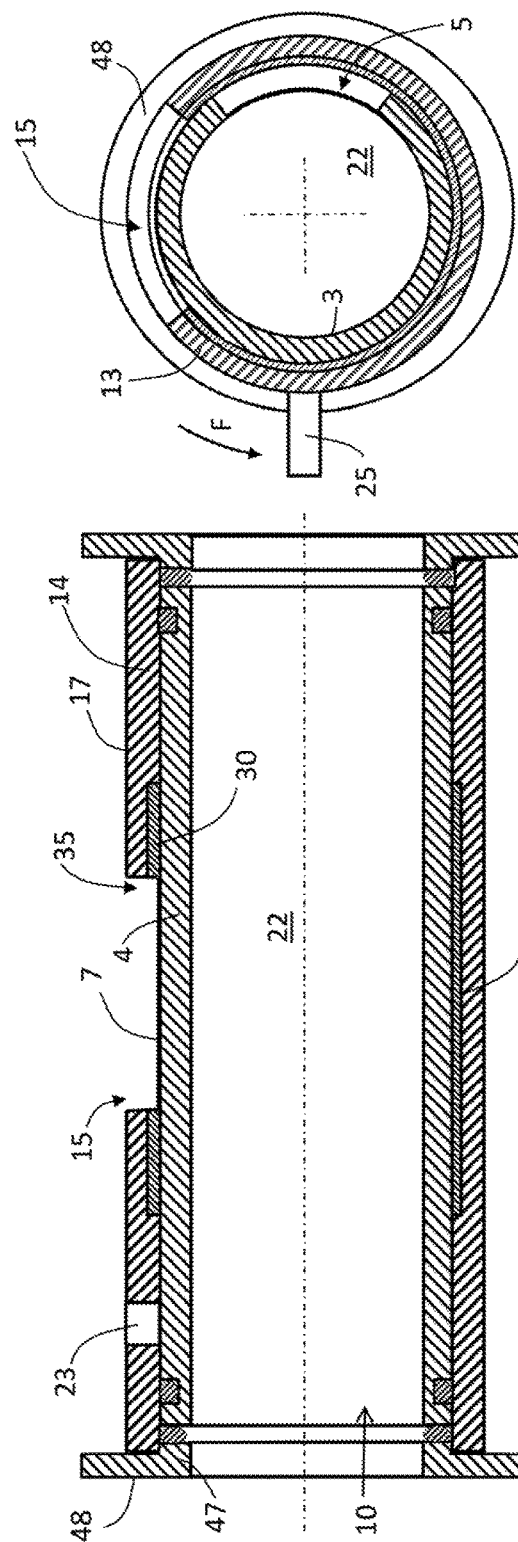

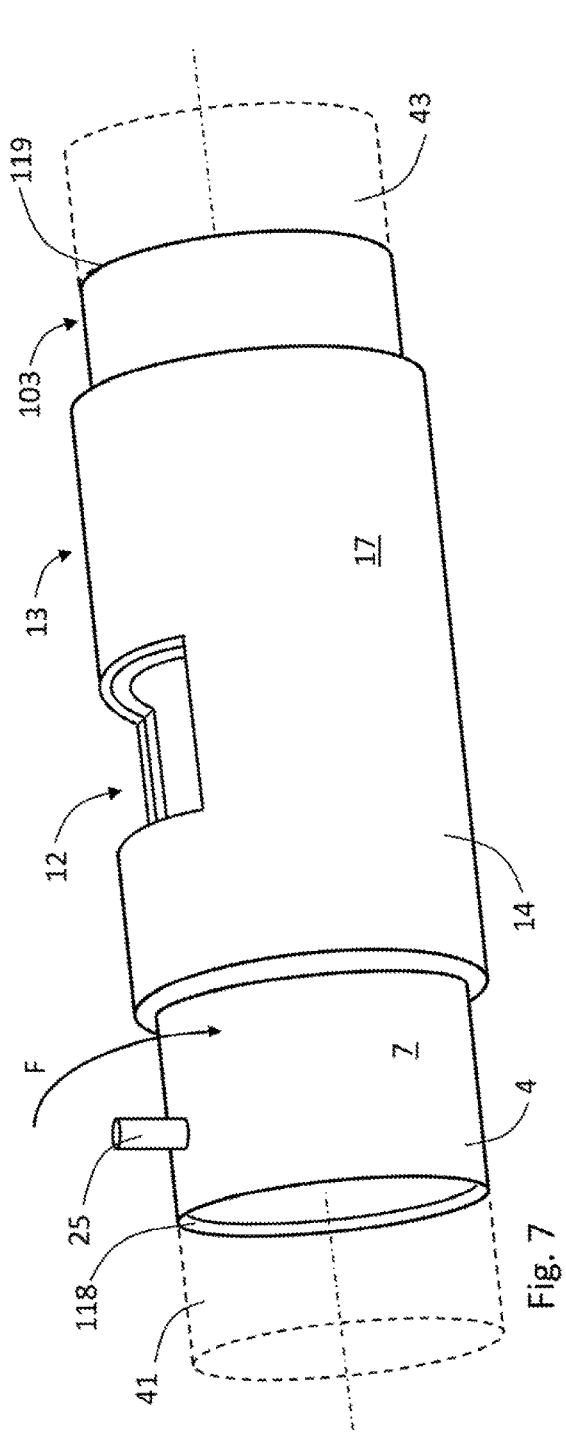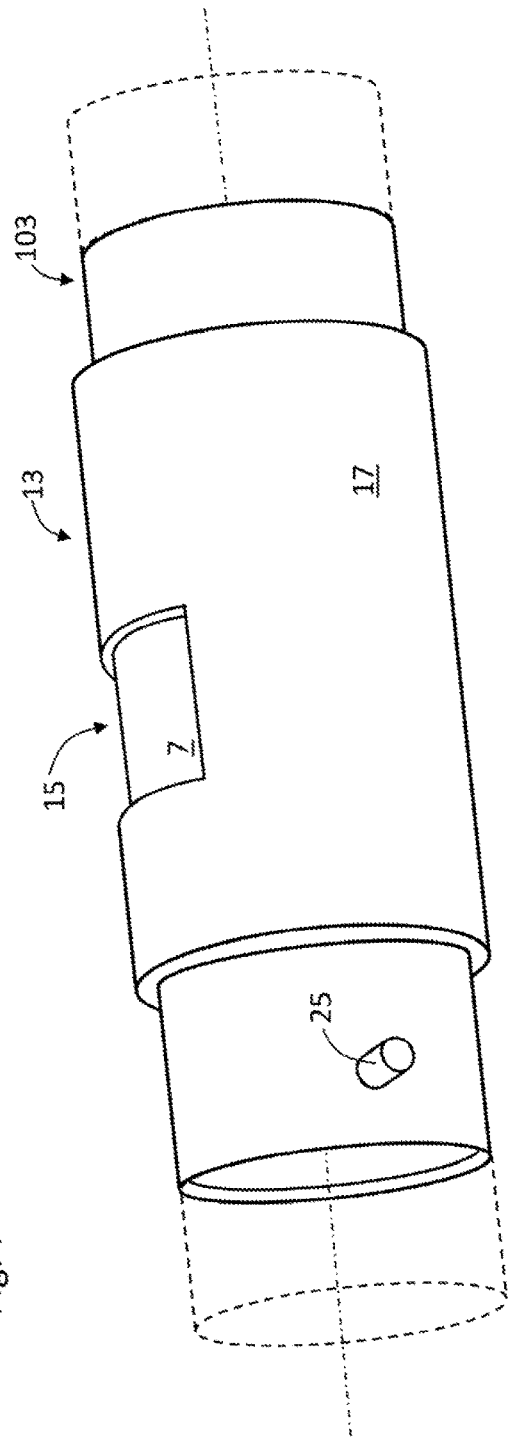
Fig. 7
Fig. 8

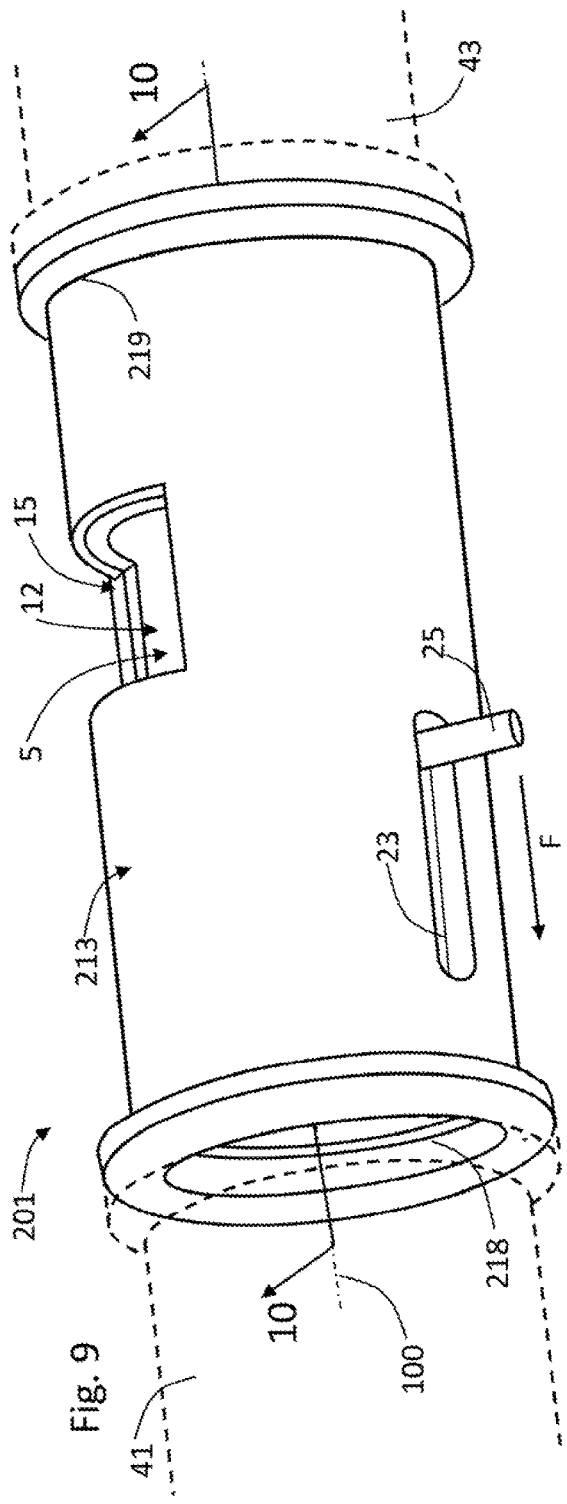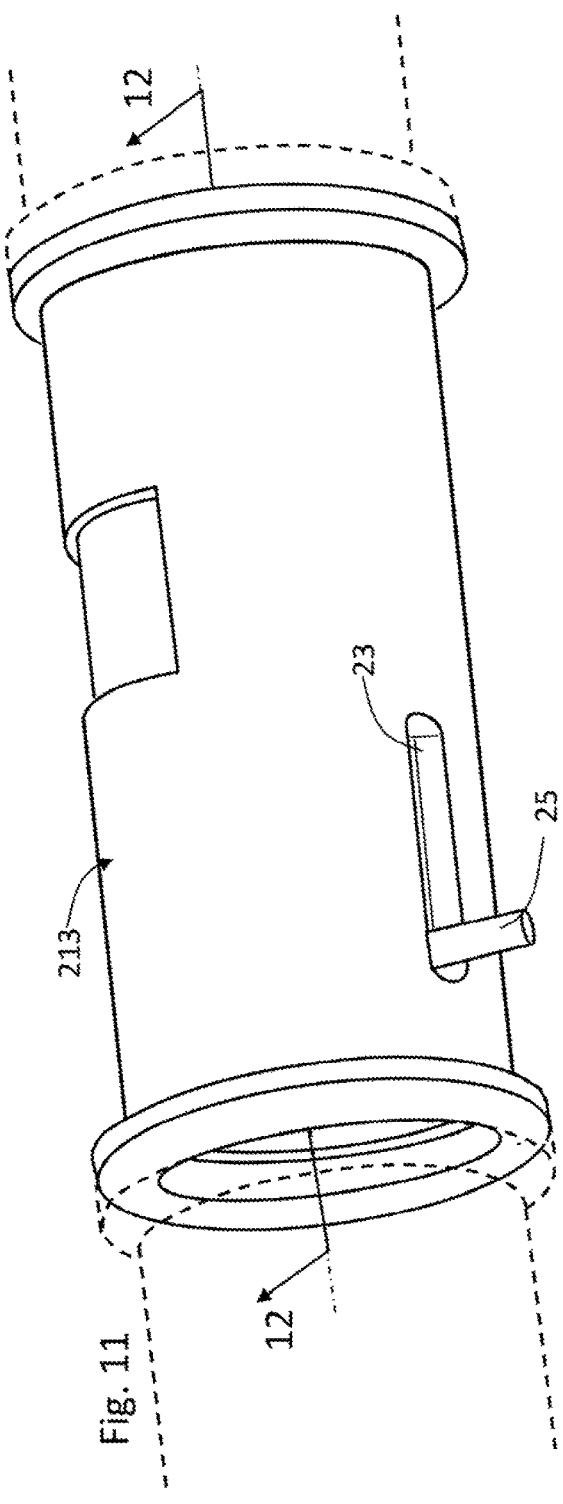

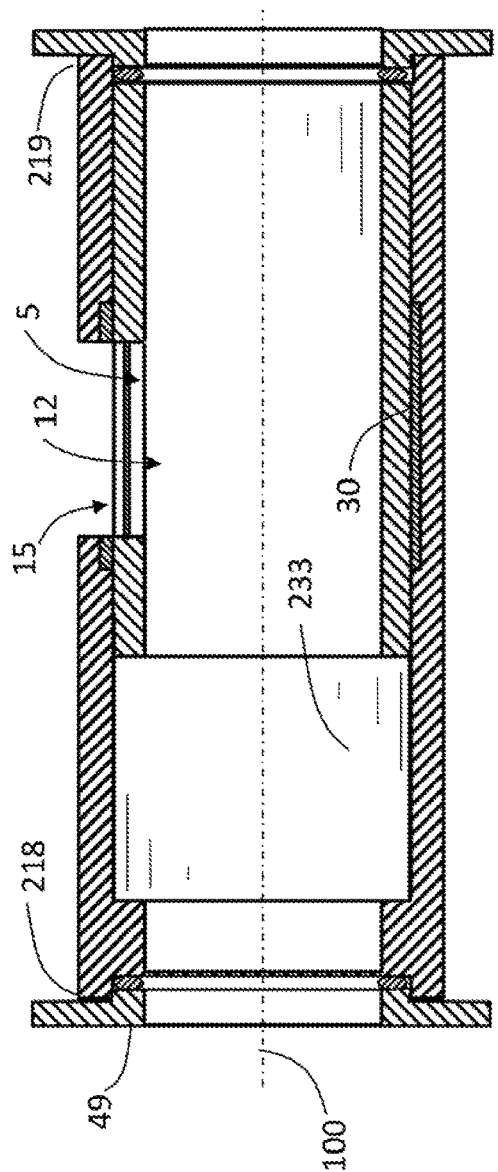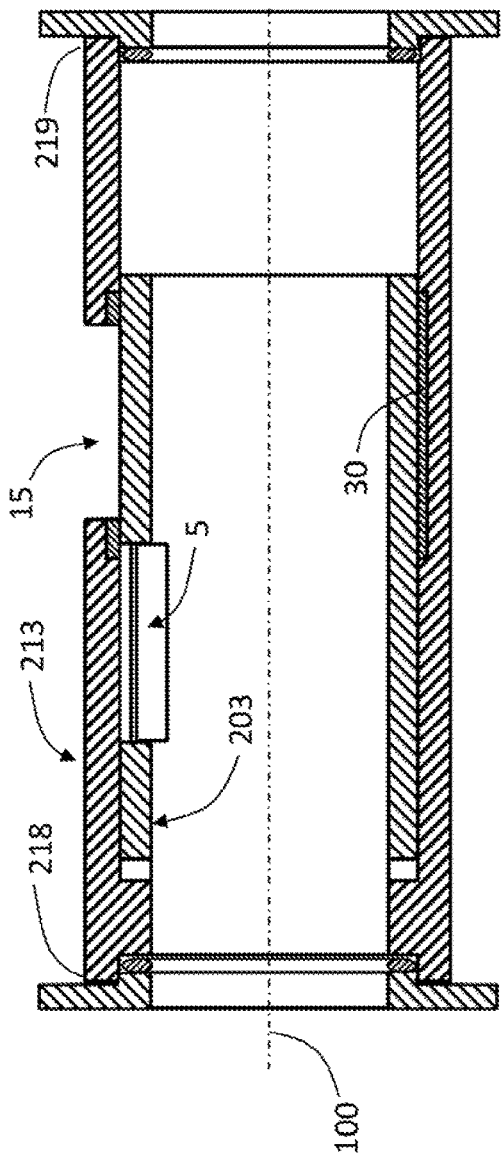

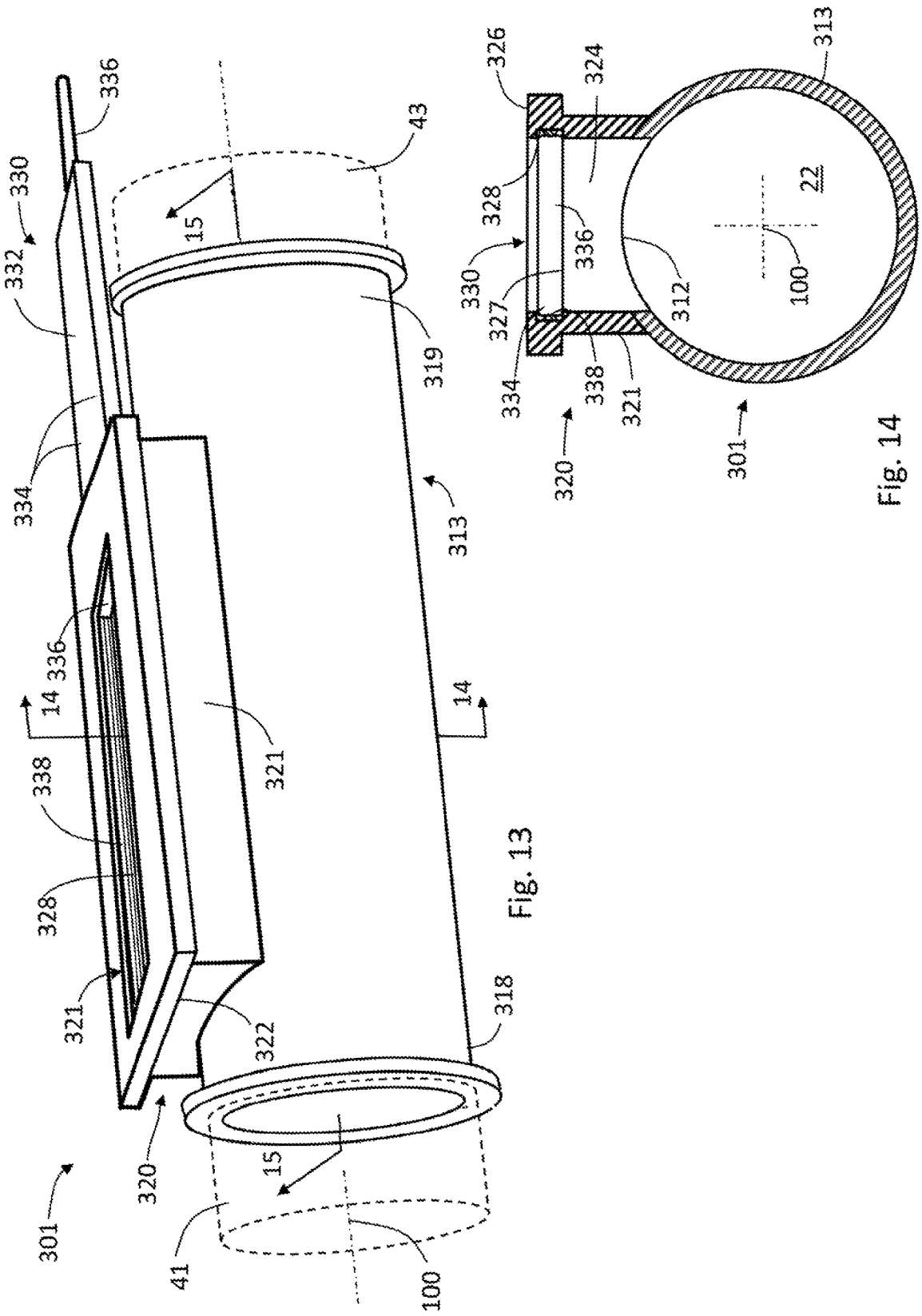

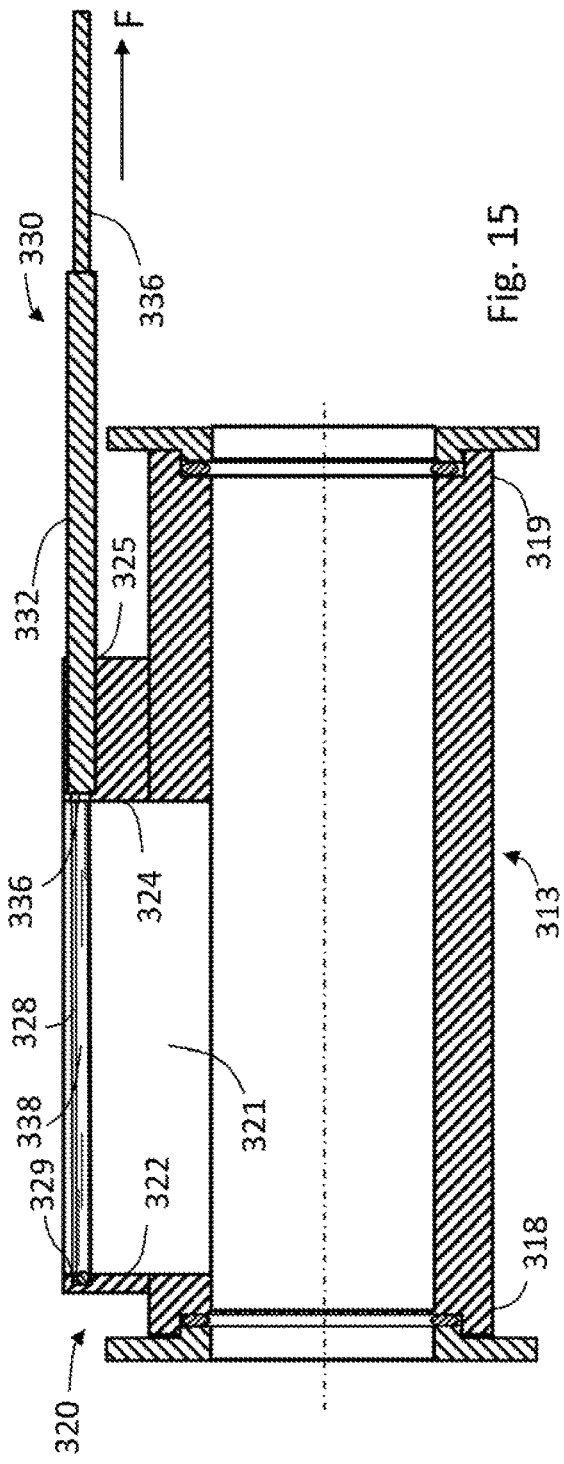
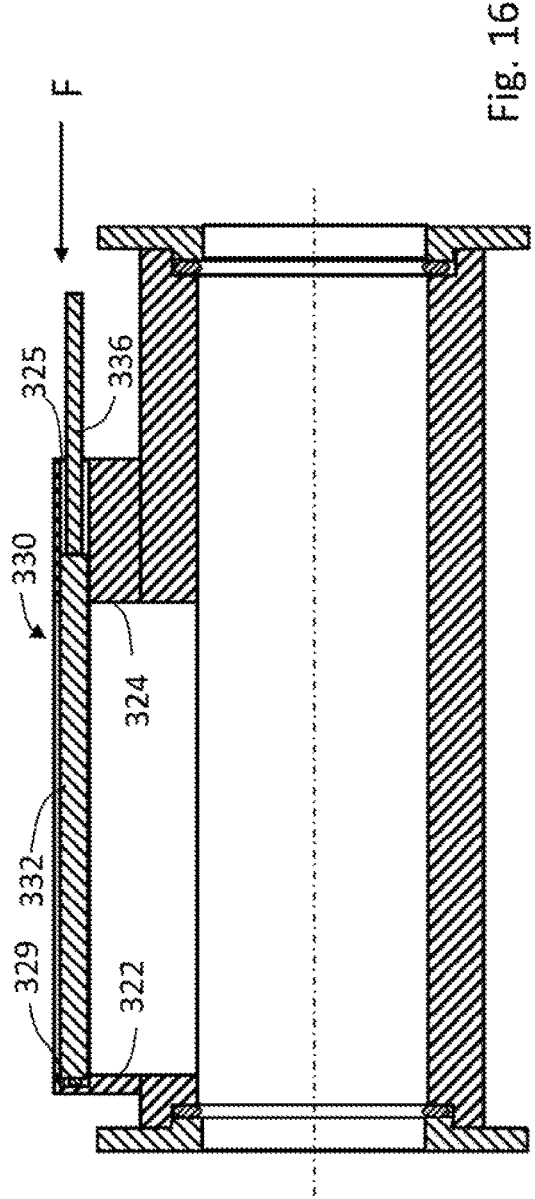

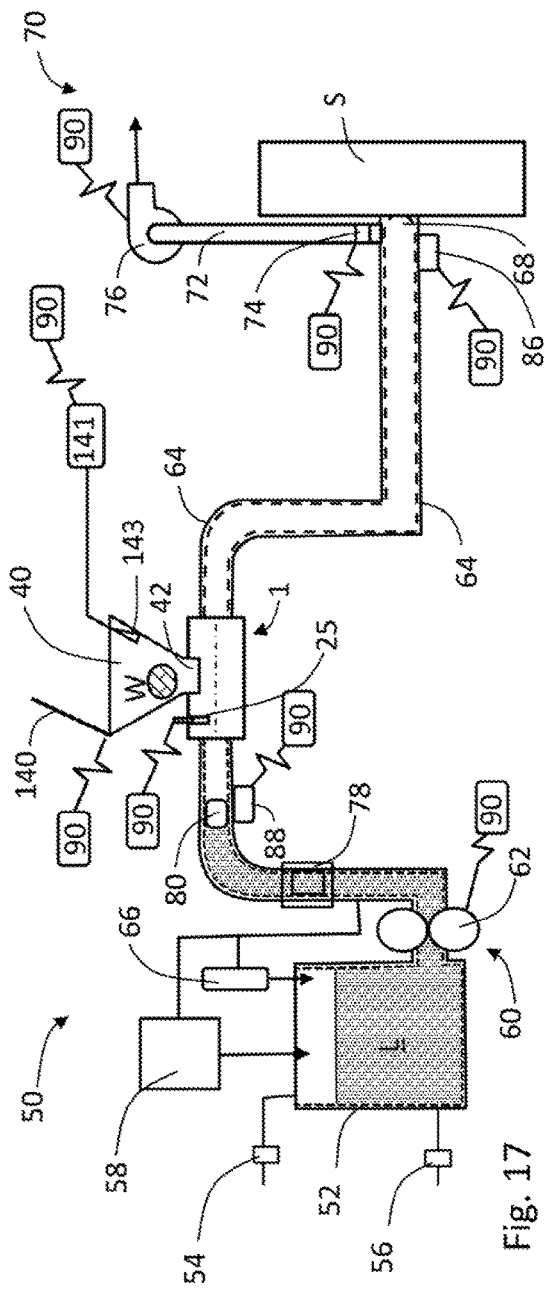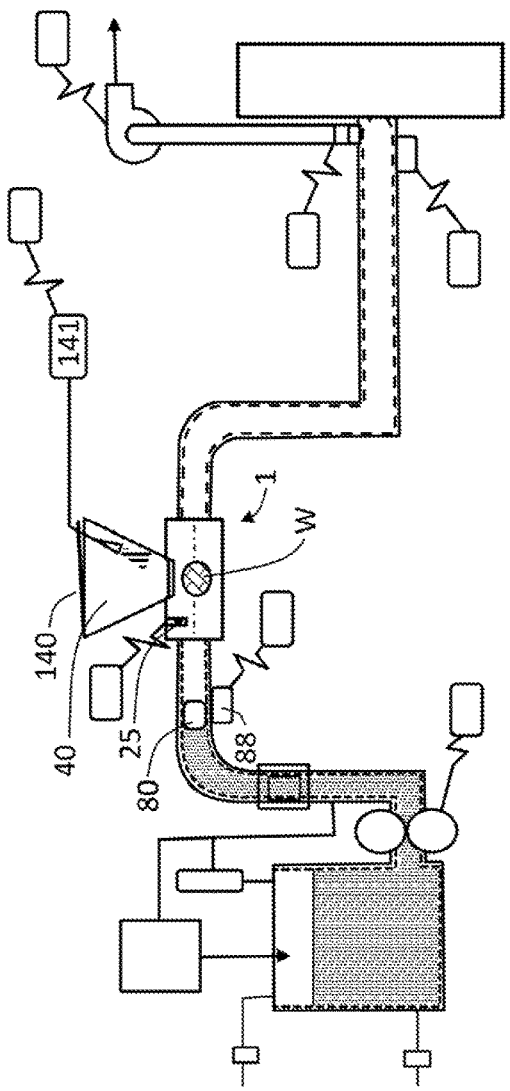

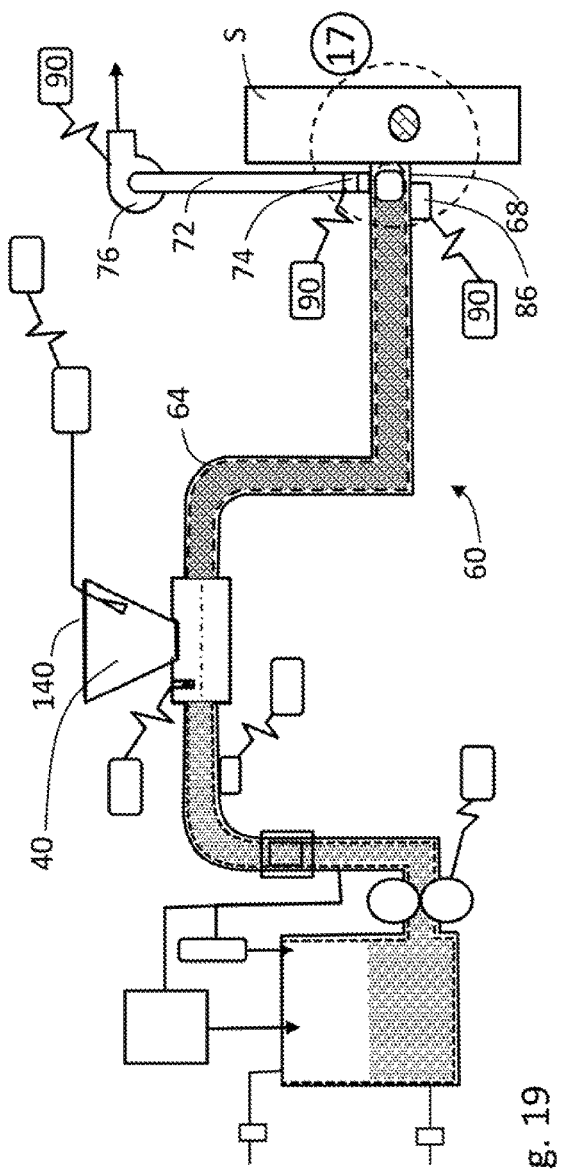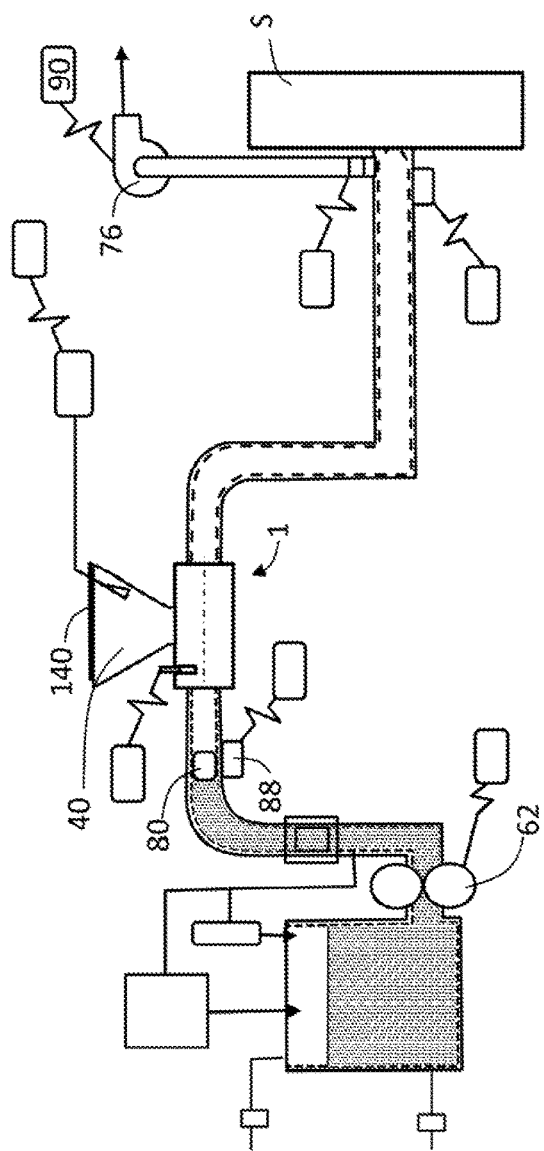
Fig. 19
Fig. 20

SIDE-OPENING SLEEVE VALVE

CROSS-REFERENCE TO RELATED APPLICATIONS

This application is a continuation-in-part of U.S. application Ser. No. 15/244,597, filed on Aug. 23, 2016, which was a continuation of U.S. application Ser. No. 15/207,726, filed on Jul. 12, 2016, which claimed the benefit of U.S. Provisional Application 62/333,327 filed May 9, 2016, and is a continuation-in-part of International Application PCT/US17/31647, filed May 9, 2017, the disclosures of which are incorporated by reference.

BACKGROUND OF THE INVENTION

A common cleaning system used in the chemical industries is a pig cleaning system, also called a pigging system. "Pigging" involves pushing a solid or liquid through a section of piping with a "pig," or plug, which is typically made of some sort of rubber, plastic, or foam, and that fits snugly inside the piping. The pushing of the pig inside of the piping is provided by a pressurized fluid, which may be a gas or liquid. The pig has a cylindrical shape, at least at a front portion and a rear portion thereof, in order to pass through similarly-shaped piping with the outer walls of the pig in close proximity or in contact with the inside surface of the walls of the piping.

Pigs are used in lube oil or paint blending to clean the pipes to avoid cross-contamination, and to empty the pipes into the product tanks (or sometimes to send a component back to its tank). Usually pigging is done at the beginning and at the end of each batch, but sometimes it is done in the midst of a batch, such as when producing a premix that will be used as an intermediate component.

The pigging system is frequently used for cleaning out the chemical product or contaminant in a manufacturing supply or product piping.

SUMMARY OF THE INVENTION

The present invention provides a waterless, self-cleaning toilet system that includes a side-opening valve to isolate the bowl of a toilet from a waste discharge piping. A side-opening valve includes a pipe section having a side opening through which passes waste from the toilet, and a means for selectively closing and sealing the side opening.

The present invention provides a side-opening valve, including a sleeve valve, as described herein.

A side-opening sleeve valve includes two lengths of co-annular cylindrical barrels. An inner barrel is rotatably disposed within an outer barrel. Each of the inner barrel and the outer barrel have a cylindrical sidewall having a shaped opening, and a central axis. The shaped opening can be rectangular, circular, oval, or other shape. For either or both shaped openings, an axial length of the shaped opening is parallel with the central axis, and the arc angle of the shaped opening extends typically less than 180 degrees, including about 150 degrees or less, and about 90 degrees or less, of the circumference of the cylindrical barrel. The shaped opening in the inner barrel can be aligned with the shaped opening in the outer barrel in a first rotated position, to provide a side opening or port into the sleeve valve. As the inner barrel is rotated relative to the outer barrel, or vice versa, the shaped openings of the inner barrel and the outer barrel move out of alignment and their overlap diminishes until the inner barrel has been rotated to a second position in which the openings do not overlap, effectively closing off the side opening of the sleeve valve.

Each barrel sidewall also has an inside surface and an outside surface, and an inlet open end and an outlet open end. An axial pathway passes through the sleeve valve between the inlet open end and the outlet open end of the inner barrel.

In a first embodiment, the inlet end of the outer barrel is connected in fluid communication to an upstream pipe. Similarly, the outlet end of the outer barrel is connected in fluid communication to a downstream pipe. The outer barrel is fixed and non-rotatable, to provide a stationary surface upon which the toilet bowl can be mounted. An annular seal layer can be disposed between the outside surface of the inner barrel and the inside surface of the outer barrel, at both the inlet ends and the outlet ends, to fluidly isolate the outside surface of the inner barrel. A sleeve seal layer can be provided between the inner barrel and the outer barrel at least along the periphery of the side valve opening. The sleeve seal layer can includes a cylindrical sheet that has an opening that registers with the opening of the outer barrel. The sleeve seal layer can be secured to either the outside surface of the inner barrel, or the inside surface of the outer barrel. The sleeve seal layer seals the space between the inner and outer barrels at the periphery of the side valve opening, effectively sealing the sleeve valve so that the objects, materials and liquids within the valve volume can pass through the inner barrel of the sleeve valve without leakage.

In a second embodiment, the inlet end of the inner barrel is connected rotatably and sealingly in fluid communication to an upstream pipe. Similarly, the outlet end of the inner barrel is connected rotatably and sealingly in fluid communication to a downstream pipe. The outer barrel is fixed and non-rotatable, to provide a stationary surface upon which the toilet bowl can be mounted. An annular seal layer can be disposed between the inlet end of the inner barrel and the upstream pipe, and between the outlet end of the inner barrel and the downstream pipe, to fluidly isolate the outside surface of the inner barrel. In the first rotated position, objects can pass from an outside space through the two aligned openings forming the side valve opening, and into the volume within the inner barrel. When the inner barrel is rotated to the second rotated position, the object within the volume is isolated from the space outside the outer barrel.

In another embodiment, the inlet and outlet ends of the outer barrel are connected in fluid communication to an upstream pipe and downstream pipe, respectively, and the inner barrel moves axially within the outer barrel, whereby in a first axial position of the inner barrel, the shaped opening in the inner barrel aligns with the shaped opening in the outer barrel to provide a side opening or port in the sleeve valve, and in a second axial position of the inner barrel, the shaped opening in the inner barrel is out of alignment and does not overlap with the shaped opening in the outer barrel, closing off the side opening of the sleeve valve.

The present invention also provides a waste disposal system for a toilet that is self-cleaning, uses no or very little water, and is extremely low odor. In one embodiment, the waste disposal system includes a side-opening valve. Once the waste has been deposited into the opening in the side-opening, and the side-opening valve is closed to isolate the waste within the closed side-opening valve, a cleaning system discharges the waste to a municipal sewer system or to a septic system. The cleaning system is based on pig cleaning technology, which clears the waste within the piping using a pipe pig. A pipe pig is a cylindrical plug that fits very tightly inside of a cylindrical pipe and is pushed or pulled by a pumped or pressurized pigging fluid on one side of the pipe pig, to push and move a material on the other side of the pipe pig through the pipes. A pipe pig can be made of a variety of materials and styles, though it is commonly made of rubber, plastic or foam rubber. Such systems are commercially available from multiple companies including Girard Industries (Houston, Tex.) and G. A. Kiesel GmbH. Pigging is used to push a solid or liquid waste through a section of piping, by pushing the pig through the inside of the piping with a pigging fluid, which can include a gas or liquid. The pig has a cylindrical, peripheral shape, at least at a front face and a rear face, in order to pass through circular piping with the outer walls of the pig in close proximity or in contact with the inside walls of the piping. The front face of the pig serves as a piston to push the waste ahead of the pig. The pig isolates the pigging fluid from the waste, avoiding direct and intimate contact between the pigging fluid and the waste. The pigging fluid can be pumped or pressurized to force the pig under fluid pressure upward, against gravity, so that the system can operate in any location at any elevation. Waste can be pushed with the pigging system up to elevations to reach a toilet where a sufficient supply of flush water may be unavailable for a conventional toilet. In addition, the pig cleaning system can push a waste uphill under pressure, to any access to a sewer, which permits a water-less toilet of the invention to be placed in a subfloor or basement of a building or other low elevation where a conventional flush toilet otherwise cannot operate because the toilet location is below the elevation of an access to a sewer system and the flush water cannot flow uphill against gravity.

The waste disposal system, employing the side-opening valve, reduces significantly or eliminates the amount of water needed to operate the toilet in a convenient and sanitary way. Typically the water usage reduction is at least 90%, and more typically at least 95%. The side-opening valve receives a waste material deposited within the bowl and falling down through the opening and into the side-opening valve. When the side-opening valve is moved to a closed position, the bowl of the toilet is isolated from the interior of the side-opening valve and from the discharge piping. The only amount of water necessary is for spraying down and cleaning the inside of the bowl after use, which runs into the interior of the side-opening valve before the side-opening valve is closed. In a non-limiting example, a toilet spray ring can be mounted at the top and inside of the toilet bowl and a series of spray nozzles can be configured to use 8-12 ounces of water under pressure to spray clean the sides and/or bottom of the bowl after each use. The cleaning water can be reused water that is captured shower or laundry water, and repurposed for toilet bowl cleaning. The system can thus be net waterless.

The receptacle for the waste material can include a toilet bowl or equivalent structure to facilitate the process of depositing waste material into the waste disposal system.

The means for integrating the waste receptacle (toilet) with, and selectively isolating it from, the cleaning system can alternatively include a closable valve disposed in a section of piping between the toilet and a waste-receiving section of piping in the cleaning system. Examples of a closable valve is a ball valve or a sliding plate over an opening, with are distinguished by having unobstructed openings therethrough The present invention also provides a method for discharging waste material from a toilet to a sewer system that involves the use of little or no water, the method comprising a flush cycle, the flush cycle including: a) providing a toilet having no pool of water in the bowl, with an opening in the bottom of the bowl that opens into a selectable closable side opening of a side-opening valve; b) closing selectively the side opening of a side-opening valve after waste material that has been depositing into the bowl has passed though the closable side opening and into the side-opening valve; c) providing a pig cleaning system that includes a pressurized fluid system including a source of pressurized fluid, a supply piping in fluid communication with an upstream end of the side-opening valve, a pig disposed in the supply piping, and discharge piping in fluid communication with a downstream end of the side-opening valve that discharges to a sewer system; d) activating the pig cleaning system to pass pressurized fluid into the supply piping at a position upstream of the pig, to push with the pressurized fluid the pig in the upstream end of the side-opening valve, into the side-opening valve, and out the downstream end of the side-opening valve, and through the discharge piping, to push the waste material out of the side-opening valve and into the sewer system, and stopping the pushing of the pig; and e) reversing the pig cleaning system to withdraw fluid from the supply piping, with the stopped pig in fluid communication with the supply piping, to pull the pig back through the discharge piping, through the side-opening valve, and to an upstream position of the pig from the side-opening valve; and optionally f) opening selectively the side opening of a side-opening valve; thereby discharging waste material from the toilet to the sewer system while using little or no water. The side-opening valve can be a sleeve valve.

An aspect of the invention includes the closing of the side opening of the side-opening valve as a direct response to the closing of a lid of the toilet after the depositing of the waste material. An aspect can also include the activating of the pig cleaning system by the closing of the lid of the toilet, or by a selectable switch.

A further aspect of the invention is a venting of the opening in the bowl of the toilet by drawing air through the discharge piping. Another aspect of the invention includes venting the discharge piping to air at a position downstream of the stopped pig.

BRIEF DESCRIPTION OF THE FIGURES

FIG. 2 shows an axial sectional view the side-opened sleeve valve taken through line 2-2 of FIG. 1A.

FIG. 4 shows the side-opening sleeve valve of FIG. 1A in a side-closed position.

FIG. 5 shows an axial sectional view the side-closed sleeve valve taken through line 5-5 of FIG. 4.

FIG. 6 shows a cross-sectional view of the side-closed sleeve valve taken through line 6-6 of FIG. 1A.

FIG. 7 shows an alternative embodiment of a side-opening sleeve valve in a side-opened position.

FIG. 8 shows the side-opening sleeve valve of FIG. 7 in a side-closed position.

FIG. 9 shows a perspective view of another embodiment of a side-opening sleeve valve of the present invention, in a side-opened position.

FIG. 10 shows a cross-sectional view of the sleeve valve of FIG. 9 in the side-opened position, taken through line 10-10 of FIG. 9.

FIG. 11 shows the side-opening sleeve valve of FIG. 9 in a side-closed position.

FIG. 12 shows a cross-sectional view of the sleeve valve of FIG. 11 in the side-closed position, taken through line 12-12 of FIG. 11.

FIG. 13 shows a perspective view of a side-opening valve of the present invention, in a side-opened position.

FIG. 14 shows a lateral cross-sectional view of the side-opened side-opening valve taken through line 14-14 of FIG. 13.

FIG. 15 shows an axial sectional view the side-opened side-opening valve taken through line 15-15 of FIG. 13.

FIG. 16 shows the side-opening valve of FIG. 15 in a side-closed position.

FIG. 17 shows a schematic of a toilet including a side-opening sleeve valve, and a waste management system that employs a pig cleaning system, in an initial state.

FIG. 18 shows toilet and waste management system in a further state in which a waste material has been deposited into the side-opened sleeve valve.

FIG. 19 shows toilet and waste management system in a further state in which the opening in the sleeve valve has been closed, and the pigging system has been activated, pushing the waste material with the pig out of the sleeve valve, through the piping system, and into the sewer system.

FIG. 20 shows toilet and waste management system in a further state in which the pigging system has been reversed, pulling the pig back to its initial position.

DETAILED DESCRIPTION OF THE INVENTION

Figure 1A:
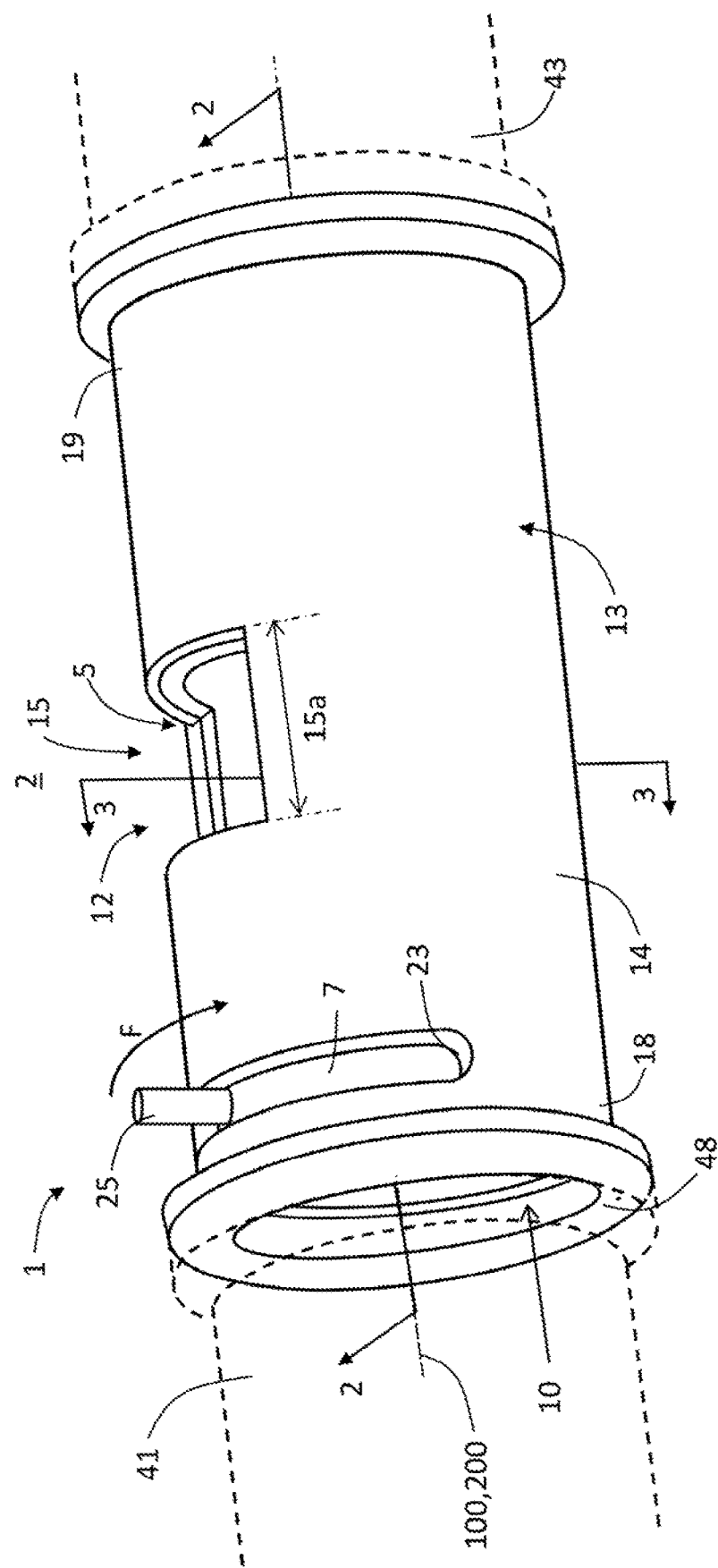
FIG. 1A shows a perspective view of a side-opening sleeve valve of the present invention in a side-opened position.
Figure 3:
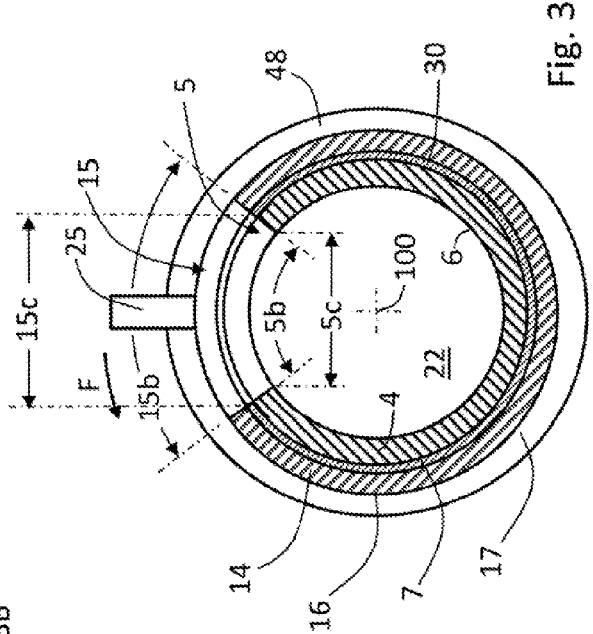
FIG. 3 shows a cross-sectional view of the side-opened sleeve valve taken through line 3-3 of FIG. 1A.

FIGS. 1A, 2 and 3 show a first embodiment of a side-opening valve, as a sleeve valve 1 that includes two lengths of co-annular cylindrical pipe. An inner pipe defines an inner barrel 3 that is rotatably disposed within an outer pipe that defines an outer barrel 13. The larger diameter outer barrel 13 is longer than the smaller diameter inner barrel 3. A standard plumbing coupling receptacle, illustrated as a flange 48 can be secured at inlet and outlet ends 18 and 19, respectively, of the outer barrel 13 to an external piping assembly. An inner shoulder 47 of each flange retains the smaller inner barrel 3 in its axial location along the length of the larger outer barrel, and is sealed fluidly to the end edges 8,9 of the inner barrel 3 with o-ring seals 49. The side-opening valve 1 typically has a single side opening, though two or more side openings can be included depending on their use and their orientation.

The inner barrel 3 has a cylindrical sidewall 4 having a shaped opening 5, and a central axis 100, and the outer barrel 13 has a cylindrical sidewall 14 having a shaped opening 15, and a central axis 200. Inner barrel sidewall 4 has an inside surface 6 and an outside surface 7, and an inlet open end 8 and an outlet open end 9, including an axial pathway 10 through the inner barrel 3 of sleeve valve 1. An axial length 5a of the opening 5 is parallel with the central axis 100, and the arc angle 5b of the shaped openings 5 extends typically less than 90 degrees of a circumference of the inner barrel 3. Depending on the materials of construction and sealing methods, the arc angle can be greater than 90 degrees, and up to about 120 degrees, including up to about 150 degrees, though less than 180 degrees. Similarly in the outer barrel 13, an axial length 15a of the opening 15 is parallel with the central axis 200, and an arc angle 15b of the shaped opening 15 extends typically less than 90 degrees of a circumference of the outer barrel 13.

In the illustrated embodiment, the axial length 5a of the inner barrel 3 and the axial length 15a of the outer barrel 13 are the same or substantially the same. Likewise, in the illustrated embodiment, the arc angle 5b of the inner barrel 3 and the arc angle 15b of the outer barrel 13 are the same or substantially the same. In alternative embodiments, the axial lengths 5a and 15a can be different, with one being shorter than the other. The effective axial opening size of the side valve opening 12 is the shorter of the axial lengths 5a and 15a. Similarly, the arc angles 5b and 15b can be different, with one being smaller than the other. FIG. 3 also shows that the opening 5 in the inner barrel 3 has a lateral open dimension 5c, which is the effective lateral opening size of the inner barrel 3, while the opening 15 in the outer barrel 13 has a lateral open dimension 15c, which is the effective lateral opening size of the outer barrel 13. The effective lateral opening size of the side valve opening 12 is the shorter of the lateral open dimensions 5c and 15c.

The size of the openings 5,15 can be longer, or narrower, along the axis of the valve, or wider around the circumference of the valve. The side opening enables a much larger entry opening since a standard "T" pipe has an opening size limited to the inlet pipe diameter. A wider opening around the circumference requires greater relative rotation of the outer barrel 13 and the inner barrel 3 to adequately seal the side valve opening 12.

It should be understood that the effective axial opening size of the side valve opening can be made substantially longer in dimensions that any maximum opening in conventional two-way and three-way flow valves where the maximum opening size is limited by the diameter of the barrel. To the contrary, the effective axial opening size of the side valve opening is limited in part only by the length of the barrel(s) of the side-opening sleeve valve.

Figure 1B:
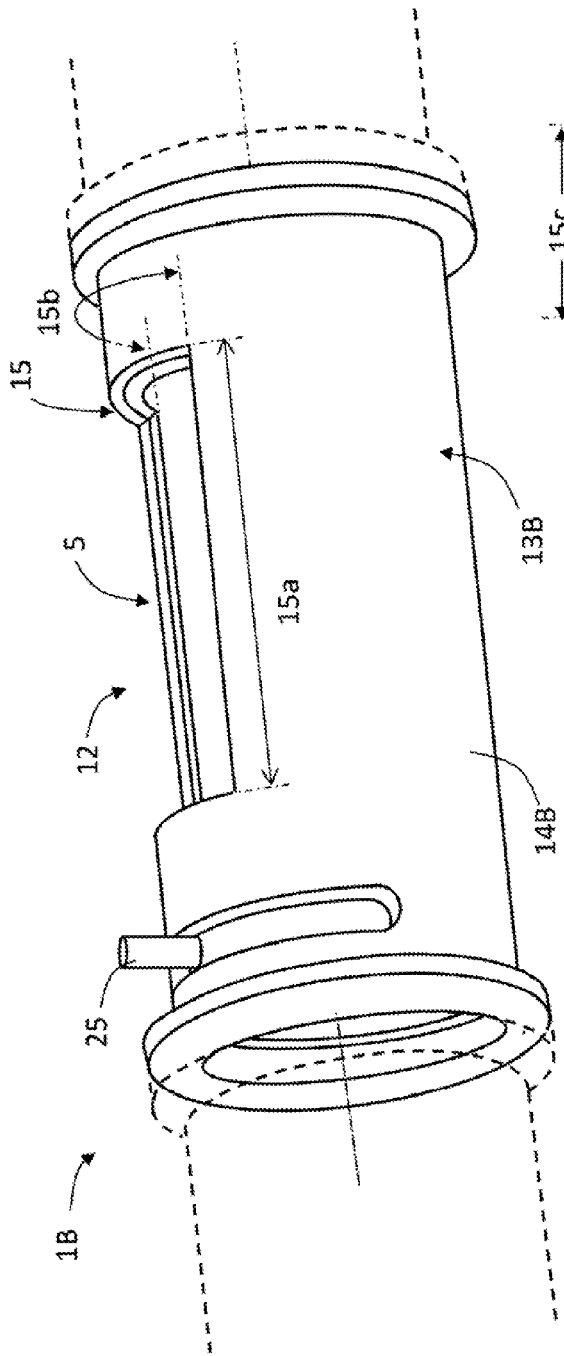
FIG. 1B shows a perspective view of an alternative embodiment of a side-opening sleeve valve in a side-opened position.

In an alternative though non-limiting embodiment of the side-opening sleeve valve shown in FIG. 1B, the shaped opening 15 in the cylindrical sidewall 14B of the outer barrel 13B has a longer axial length 15a and a shorter an arc angle 15b, as compared to the embodiment of FIG. 1A.

An advantage of the side-opening sleeve valve of the present invention is an unobstructed opening 15 in the cylindrical sidewall 14 of the outer barrel 13 aligns with an unobstructed opening 5 in the cylindrical sidewall 4 of the inner barrel 3, to provide an unobstructed side valve opening 12. The side opening sleeve valve of the present invention contrast with impeded flow openings typical of conventional through-flow valve and three-way valves that may include closing flappers, valve rods, and other seal features.

The sleeve valve of the present invention is also provided with unobstructed, smooth-bore along the axial pathway 10, through the entire length of the interior volume 22 of the inner barrel 3, from the inlet open end 8 and an outlet open end 9. This feature of the side-opening sleeve valve is particularly useful when the side-opening sleeve valve is used with a waste management system that uses a pig cleaning system for moving waste material out of the sleeve valve, as described hereinafter.

In addition, the side-opening sleeve valve of the present invention can be configured with a side valve opening 12 of any desired or useful shape or dimension. The ratio of the effective lateral opening size to the effective axial opening size of the side valve opening can be widely varied, to provide any practical or particular utility. In one non-limiting example, the effective axial opening size can be substantially longer, and multiple times longer, than the effective lateral opening size, in order for long or elongated solid, semi-solid, or viscous objects can pass through the opening more readily and easily. The ratio of the effective axial opening size to the effective lateral opening size of the side valve opening can range from at least about 1:1, including at least 2:1, 3:1, 4:1, 5:1 or 6:1, and up to about 20:1, including up to 10:1, 8:1, or 6:1.

This feature of the side-opening sleeve valve is particularly useful when the side-opening sleeve valve is used with a toilet, as described hereinafter, for receiving and moving human wastes from the toilet bowl to the sewer system, particularly when the toilet uses a limited amount, of water, including no water, in the toilet bowl to move the wastes out of the toilet bowl. In term of its use with a toilet, the effective axial opening size is at least about 4 inches, and up to about 12 inches, and the effective lateral opening size is at least about 2 inches, and up to about 5 inches, although somewhat narrower or larger opening sizes can be effective, particular when some amounts of water are used in the toilet bowl to help move the wastes out of the toilet bowl and into the sleeve valve.

FIG. 1A shows the sleeve valve 1 in a first rotated position with the shaped opening 5 in the inner barrel 3 aligned with the shaped opening 15 in the outer barrel 13, to form a side valve opening or port 12 as a passage from the outside space 2 into the inner volume 22 of the inner barrel 3. As the inner barrel 3 is rotated, the shaped openings 5 and 15 of the respective inner barrel 3 and the outer barrel 13 move out of alignment and diminishes the overlap as, the inner barrel 3 rotates to a second rotated position in which the openings 5,15 do not overlap, and the valve port is closed, shown in FIGS. 4-6.

An annular seal 44 can be disposed at both the inlet ends 8, 18 and the outlet ends 9,19, between the outside surface 7 of the inner barrel 3 and the inside surface 16 of the outer barrel 13, to fluidly isolate the outside surface of the inner barrel 3 inboard of the seal 44 from the inner space 22. The annular seal 44, shown as an o-ring disposed within a groove 45 in the outside surface 7 of the inner barrel, with the o-ring sealing against the inside surface 16 of the outer barrel 13. Alternatively, the annular seal o-ring can be disposed within a groove in the inner surface of the outer barrel, with the o-ring sealing against the outside surface of the inner barrel.

A sleeve seal layer 30 is provided between the inner barrel 3 and the outer barrel 13 at least along the periphery of the side valve opening 12. The sleeve seal layer includes a sheet material that has an opening 35 that registers with the opening 15 of the outer barrel 13. The sleeve seal layer 30 extends axially beyond the arcuate edge in the inner barrel 3 that defines the opening 5 of the inner barrel 3. In the illustrated embodiment, the sleeve seal layer 30 is disposed within a wide, annular groove 21 formed into the inside surface 16 of the outer barrel 13 and overlapping the opening 15, and the sleeve seal layer is a cylinder having the opening 35 that registers with the outer sleeve opening 15. Typically, the planarity of the sleeve seal layer 30 is uniform, and the thickness is slightly more than the depth of the annular groove 21, in order to frictionally seal against the outside surface 7 of the inner barrel 3.

In the first rotated position shown in FIG. 1A, objects (as a non-limiting example, waste) can pass from the outside space 2 through the side valve opening 12 formed by the two aligned openings 5,15, and into the inner volume 22 within the inner barrel 3. Rotating the inner barrel 3 to the second rotated position, shown in FIG. 4, closes the sleeve valve port 12, thereby isolating the objects within the volume 22 from the space 2 outside the outer barrel 13. FIGS. 1 and 4 illustrate a means for rotating the inner barrel 3 within the outer barrel 13. The outer barrel 13 has a widened slot 23 extending about 90 degrees along and through the circumference of the sidewall 14. A post 25 extends from the outside surface 7 of the inner barrel 3, and through the widened slot 23 in, and beyond the outer surface 17 of, the outer barrel 13. Dragging or pushing by force F the post 25 along the slot 23 rotates the inner barrel 3 between the first rotated position (FIG. 1) and the second rotated position (FIG. 4). The actuation of the post 25 can be accomplished either manually or mechanically, for example, with a solenoid actuator. In the illustrated embodiment, the slot 23 and post 25 are positioned between the seal 44 and the sleeve seal layer 30 to avoid fluid communication and leakage through the slot 23.

The components of the sleeve valve 1 can be constructed of any material commonly used in valve manufacture including plastics, including polyvinyl chloride (PVC) and acrylonitrile butadiene styrene (ABS), porcelain, ceramic, and metals and alloys thereof, including aluminum, copper, brass, iron, steel, stainless steel, and other alloy, as determined by the application for corrosion, pressure, temperature, and other concerns.

In the embodiment shown in FIGS. 1-6, the inlet end 18 of the outer barrel 13 includes a means for connecting the outer barrel 13 in fluid communication to an upstream pipe 41, illustrated as a flange 48. Similarly, the outlet end 19 of the outer barrel 13 includes a means for connecting the outer barrel 13 in fluid communication to a downstream pipe 43, illustrated as a flange 48. The means for connecting the outer barrel 13 can also be provided by a threaded connection, or similar or equivalent connection.

In another embodiment shown in FIGS. 7-8, a sleeve valve 101 has the inlet end 118 of the inner barrel 103 is connected rotatably and sealingly in fluid communication to the upstream pipe 41. Similarly, the outlet end 119 of the inner barrel 103 is connected rotatably and sealingly in fluid communication to a downstream pipe 43.

FIGS. 9-12 show another embodiment of a sleeve valve 201. The sleeve valve 201 has an outer barrel 213 having an inlet end 218 and an outlet end 219 connected in fluid communication to an upstream pipe 41 and downstream pipe 43, respectively, and an inner barrel 203 that moves axially within an annular groove 233 formed into the inner surface 216 of the outer barrel 213 along axis 100. In a first axial position shown in FIGS. 9 and 10, the shaped opening 5 in the inner barrel 203 can be aligned axially with the shaped opening 15 in the outer barrel 213, to provide a side opening 12. In a second axial position shown in FIGS. 11 and 12, the shaped opening 5 in the inner barrel 203 is out of alignment and does not overlap with the shaped opening 15 in the outer barrel 213, effectively closing off the side opening of the sleeve valve 201.

FIGS. 13-16 show another embodiment of a side-opening valve 301. The side-opening valve 301 has a single outer barrel 313 having an inlet end 318 connected in fluid communication to an upstream pipe 41 and an outlet end 319 connected in fluid communication to a downstream pipe 43. The outer barrel 313 has a side opening 312 parallel to the long axis 100 of the barrel 313. Vertical parallel sidewalls including a pair of sidewalls 321 and a pair of end walls 322 and 324 form a cylinder side entry port 320 that extends from the entire perimeter of the side opening 312 of the barrel 313 having an outer opening 325 parallel with the long axis 100 of the outer barrel 313. The side entry port 320 can be mechanically and sealingly attached to the outer barrel 313, and is illustrated manufactured as a single unit with the outer barrel 313, requiring no connecting seams. The side entry port 320 can include an entry flange 326 that lies in a plane disposed in parallel with a tangent to the barrel 313, to provide a flat and stationary surface upon which a toilet bowl can be mounted. The side entry port 320 has a lateral opening 327 forming in the end wall 324 to allow entry and movement of a sliding plate valve 330. The opposed sidewalls 322 each have a lateral groove 328 formed along the upper inside surface, to provide channels that retain the lateral side edges 334 of the plate 332 as the plate 332 slides axially along the grooves 328. An end groove 329 is also formed in the end wall 322. The lateral grooves 328 also extend through the end wall 324, adjacent the lateral opening 327, to allow the plate 332 to slide between a first position, shown in FIG. 15, withdrawn away from the opening 321 of the port 320, and a second position, shown in FIG. 16, covering the opening 321 of the port 320, with the end edges 336 disposed within the end groove 329. A seal 338 can be formed between the grooves 328 and 329 and the lateral and end edges 334,336 of the plate 332, and between the plate 332 and the lateral opening 327 formed in the end wall 324, to prevent leakage of fluid around the plate 332 in its closed, second position. The sliding plate valve 330 includes a planar body 332 having a lateral width between lateral side edges 334 that is configured to register within the side grooves 328 in the opposed sidewalls 321, and a longitudinal length sufficient to cover the opening 321 in the upper end of the side entry port 320 in the closed position shown in FIG. 16. A shaft 336 or other handle or fitment can be actuated under force F, manually or by a mechanical or electro-mechanical actuator shown in FIG. 23 as actuator 340, and well known to persons skilled in the art, and which can include without limitation a servo motor, or a pneumatic or hydraulic actuator, and a solenoid actuator, to slide axially the plate 332 under the force F between with first and second positions. Typically the length of the plate 332 is longer than the length of the opening 321 such that the plate 332 in the closed position shown in FIG. 16 also extends through the end wall 324, and typically at least twice as long as its lateral width. The upper portion of the end wall 324 is elongated axially to extend the length groove 328 within the end wall 324 for stability and of the plate 332.

Figure 22:
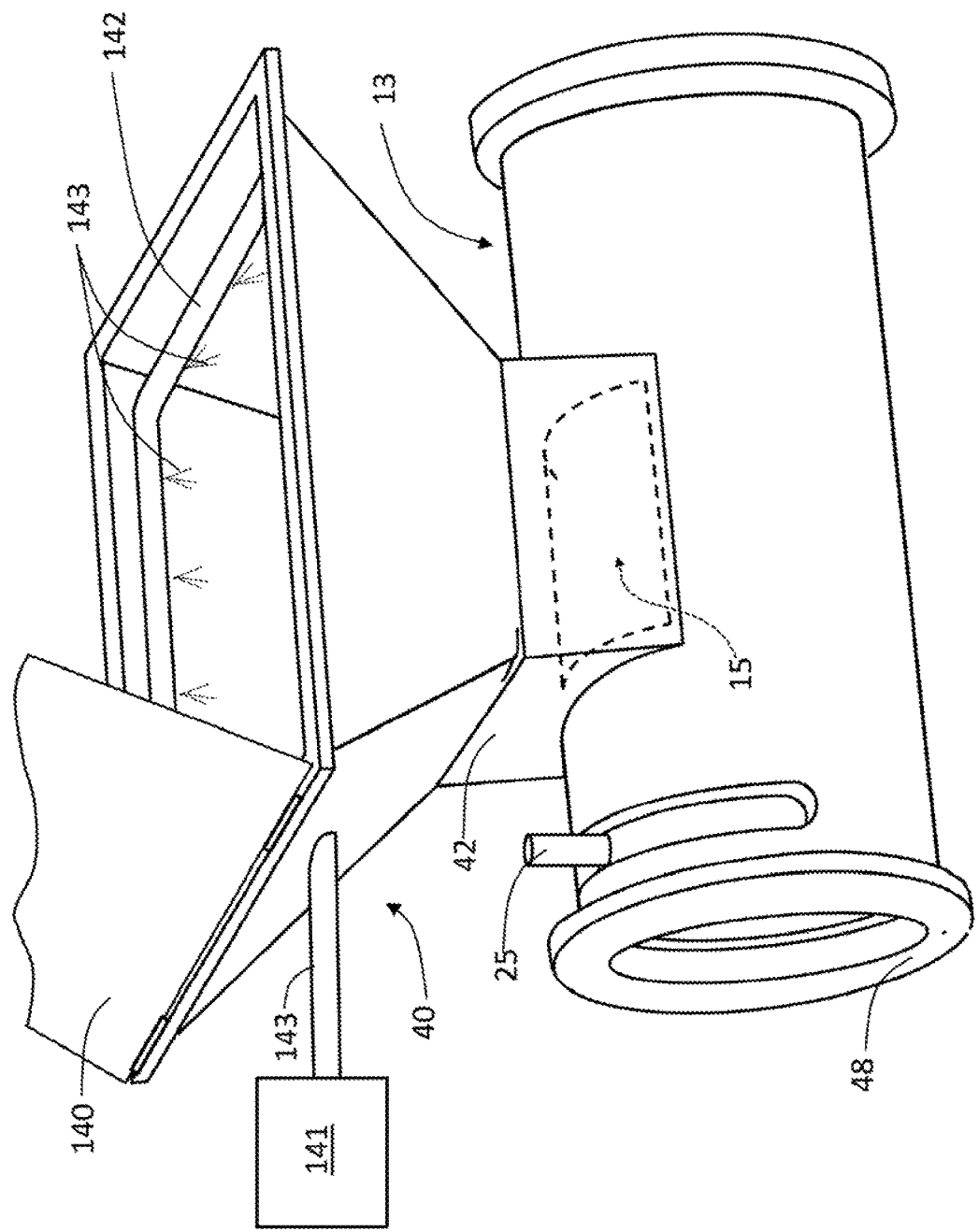
FIG. 22 illustrates a toilet bowl having an open lower end that is mounted onto the sleeve valve.

FIG. 17 shows a waste management system 50 according to the present invention that employs a side-opening valve, illustrated as the sleeve valve 1 described above. The waste management system includes a toilet bowl 40 having a lid 140, that receives wastes W, and having an open lower end 42 that is configured to mount onto the sleeve valve 1 with the lower end 42 aligned with the opening in the outer wall 13 of the sleeve valve 1, as shown in FIG. 22. Though not illustrated, the bottom opening 42 of the toilet bowl 40 can have the same shape as the side valve opening of the sleeve valve 1, or a different shape, configured for leak-proof attachment to the sleeve valve 1. When used in combination with a toilet and the pig cleaning system, the sleeve valve 1 should include on a single side opening, oriented face upward, and the pathway 10 is oriented horizontal or at a slight angle from horizontal.

In use with a toilet and toilet bowl 40, and uses a pig cleaning system 50 described hereinafter, the sleeve valve 1 is typically positioned with its side opening 12 immediate below and in approximate alignment with the outlet of the toilet bowl 40. This positioning of the sleeve valve 1 and the toilet bowl 40 is particularly advantageous when the toilet uses a limited amount, of water, including no water, in the toilet bowl to move the human wastes out of the toilet bowl and into the sleeve valve.

The waste management system 50 uses a pig cleaning system. Once the waste has been isolated within the closed sleeve valve 1, the waste management system 50 discharges the waste to a sewer system or to a septic system.

The waste management system 50 includes a pigging fluid pumping assembly 60, and a venting system 70, and a power and control system 90. In the following description, the pigging fluid is typically a flowable liquid. In an alternative embodiment, the pigging fluid is a compressible gas that can include air.

A pig 80 can consist of a cylindrical plug in order to pass through circular piping, with the outer walls of the pig 80 in contact with the inside walls of the piping. Pipe pigs are made of a variety of materials and styles, though are most commonly made of rubber, plastic or foam rubber.

A fluid container 52 is sized sufficiently to hold all of a pigging liquid L of the system, and can include a vent 54 to compensate for changes in the fluid level, and an inlet/outlet port 56 for emptying, draining and filling the fluid container 52. An optional filtration system 58 can be included which circulates the fluid from the fluid container 52 through a filtering media to remove any waste or debris that the fluid might pick up when working through the piping assembly and enables constant re-use of the pigging liquid.

The pigging liquid L can be water or other aqueous solution, or an oil or other hydrophobic or water-immiscible liquid, which is pumped to push and pull the pipe pig through the piping. The pigging liquid can include a water-immiscible oil, including a vegetable oil, which can spontaneously separate from water and other water soluble waste material. Practically any liquid can be used as the pigging fluid, provided it is non-flammable and non-corrosive, and suitable for a broad range of ambient temperatures.

The fluid pumping system 60 includes a fluid pump 62 that pumps the pigging fluid under pressure into the piping system behind, or upstream of, the pig 80. The pump 62 can be a positive displacement piston or gear pump, a centrifugal pump, or other suitable pumping means. The pump should also be a reversible pump that can pump from the piping assembly back into the fluid container 52. Alternatively, the suction and discharge piping arrangement of the pump can be configured to send the pigging fluid either from or into the fluid container.

The piping system typically includes lengths of smooth-bore transfer piping 64 that can withstand working pressures that might be experienced behind the pig 80. The transfer piping is sized uniformly to the diameter needed for smoothly and consistently driving the pig 80 through the piping assembly. The transfer piping can be standard plumbing piping, including PVC, ABS, metal, aluminum, copper, brass, iron and other plastic, metal or ceramic material, provided it meets criteria to withstand the working pressures. The piping system optionally includes a pressure relief system 66 that will activate in the event of excessive fluid pressure in the piping assembly, and relieve back to the fluid container. The elbows and other joints typically have longer radii to avoid binding the pig in the turns.

In the alternative embodiment, the pigging fluid can be a compressible gas. A gas compressor or blower provides a supply of compressed gas, or a vacuum capacity, suitable for operating the pig cleaning system. A fluid container can comprise a pressurizable and/or vacuum-rated container sized and rated for pressure sufficiently to hold the compressed gas, or vacuum, as required by the system. The compressed gas system also provides vent piping, pressure relief valves, and an optional filtration system as needed.

The piping system also includes a stop feature at the terminal end 68 of the piping assembly 60. In the illustrated embodiment shown in FIG. 21, the stop feature can be a short section of pipe 69 that has a smaller internal diameter (ID) than the transfer piping 64, so that the pig 80 cannot proceed further into the section of pipe 69. The pressure relief system 66 can activate upon excessive fluid pressure in the piping assembly exceeding a high pressure limit when the pig 80 dead-ends into the smaller ID) piping 69, to relieve and return the discharge from the pump 62 back to the fluid container 52. Preferably, the liquid L in the pigging system remains in fluid communication with the back end 82 of the pig 80, and the piping behind the pig 80 has no open passage or vent, ensuring withdrawal and return of the pig 80 when the direction of liquid pumping in the system is reversed. In addition, the stop device 69 is configured to cause the objects (for example, solid and liquid waste (W) to be discharged into a segment S of the sewage system. For example, the sewage system can include a pipe or conduit into which the waste is pushed, which causes the wastes to move by gravity into a municipal sewage system or a septic system. A one-way flow valve, such as a flapper valve or a swing check valve, can be installed at the terminal end 68 of the pipe assembly to prevent the waste W or any odors from the sewage system from re-entering the piping assembly 60.

Figure 21:
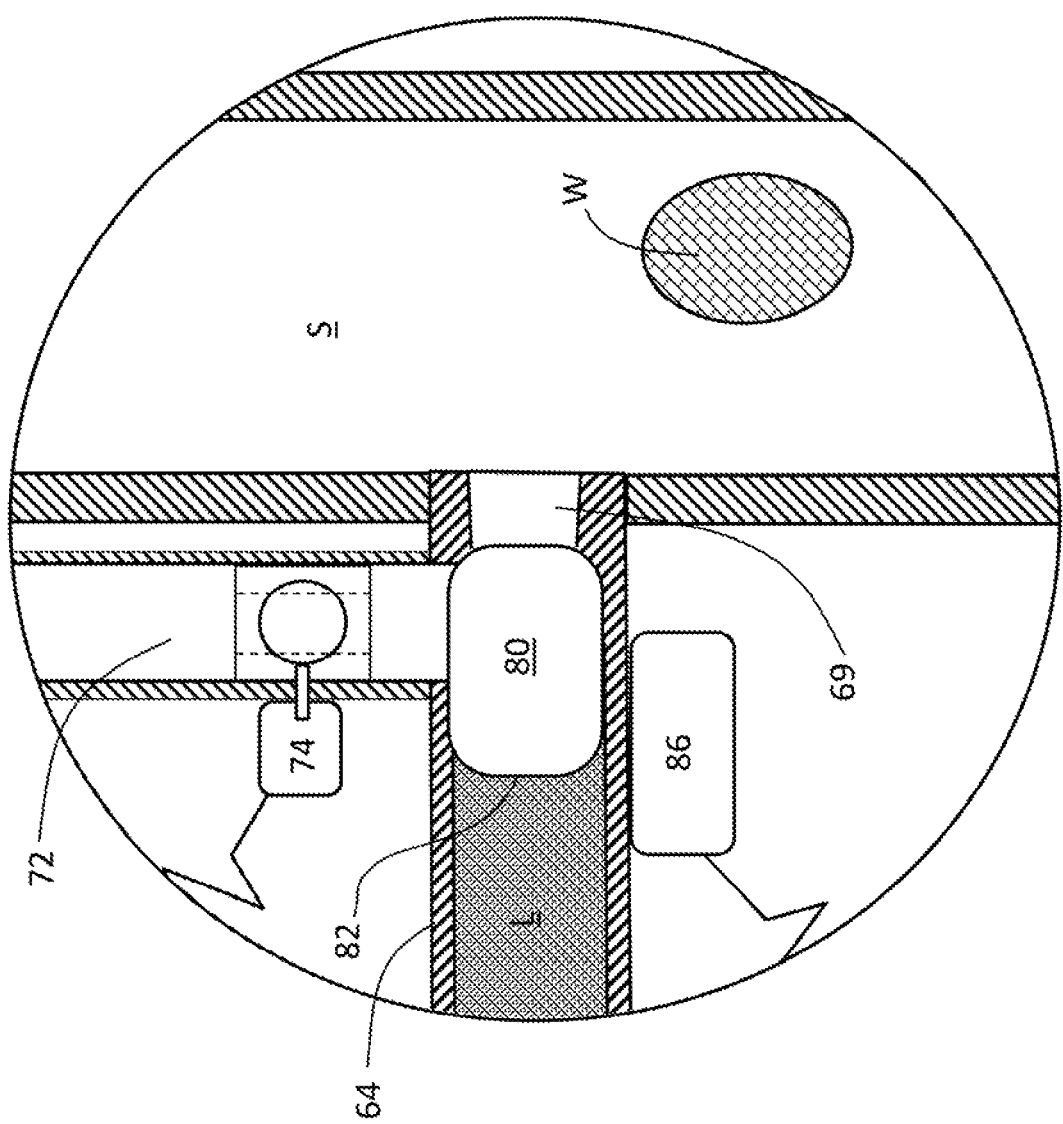
FIG. 21 is a detailed view of a portion of the terminal section of the piping shown in FIG. 19.

An alternative stop feature can comprise a stop sensor 86, also shown in FIGS. 19 and 21, that is configured to detect the presence of the pig 80 inside the piping 64 at a flush termination position, and signals a controller in the control system 90 to start or stop the pump 62, and to control the direction of the pigging fluid flow in the flush cycle. The pig 80 can include or contain a ferric metal material, a radio frequency device, a magnetic strip, or other media enabling a sensor position outside the sidewall of the piping to detect the pig inside the piping, especially at the three system locations including the flush initiation position, the flush termination position, and a pig installation and removal station (described hereinafter), as well as anywhere along the piping system. The pig position sensor can be located along the piping and positioned on or even inside or within the wall of the piping system, including at a location where the piping pig should be stopped. The sensors detect the presence of the pig by any number of means including radio frequency, magnetic media, or other forms of detection.

The piping system 64 also includes a return sensor 88 that detects the presence of the pig 80 inside the piping 64 and is positioned upstream of the sleeve valve 1 in a flush initiation position as shown in FIG. 17. The return sensor 88 signals the controller in the control system 90 to stop the pump 62 when the pig 80 has returned to its flush initiation position. The flush initiation position can be just upstream and adjacent to the sleeve valve 1, as shown, or in another location upstream from the sleeve valve, including within a pig installation and removal station, described below.

The piping system 64 also includes the vent system 70, disposed at the discharge end of the piping. The vent system 70 provides a means for venting the piping assembly, at or near the terminal end 68, to avoid drawing back the waste W and vapors from the sewer system S through the piping 64. Preferably, the vent system 70 uses a separate venting pipe 72 with a vent valve 74. The vent valve 74 can be a controlled valve that is moved between open and closed positions by the controller device of system 90. The vent valve 74 can be closed during operation of the flushing cycle, as described below, to prevent waste W from being pushed into the vent system, and opened to allow fresh air downstream and ahead of the pig while withdrawing the pig to its starting position. As the pig is being drawn back to the flush initiation position, the vent valve 74 is opened to avoid drawing a vacuum ahead of the pig 80, to prevent the pipe 64 from collapsing. In addition, the vent valve 74 can remain open after the pig has been returned to its initial position and the sleeve valve 1 has been returned to the open position (FIG. 17), to place the venting system into air flow communication with the toilet 40, to provide an exit for odors. Alternatively, the vent valve 74 can be a one-way flow valve, such as a flapper valve or a swing check valve, which autonomously allows air flow from the venting pipe 72 into the piping system 60, but prevents fluid flow or waste from the piping system 60 into the venting pipe 72.

The vent system 70 can also include a fan or blower 76, which draws fresh air into the system 50 at the toilet 40, via the open sleeve valve 1 and piping 64, to more effectively and efficiently eliminate malodors in the toilet room, during and after use. The fan 76 is in fluid communication with the vent pipe, and can be activated when the user of the toilet begins use, in order to draw air and associated odors down through the open sleeve valve 1, and the piping 64 and out through the vent pipe of the venting system 70. The process draws a small amount of air from the bathroom to the outside air through the sanitary waste pipe to eliminate odors associated with the use of the system. The air fan 76 can be controlled to operate only when the person uses the toilet, such as raising the seat or cover, and to shut off when the seat or cover is closed, or when the sleeve valve 1 is closed.

Figure 23:
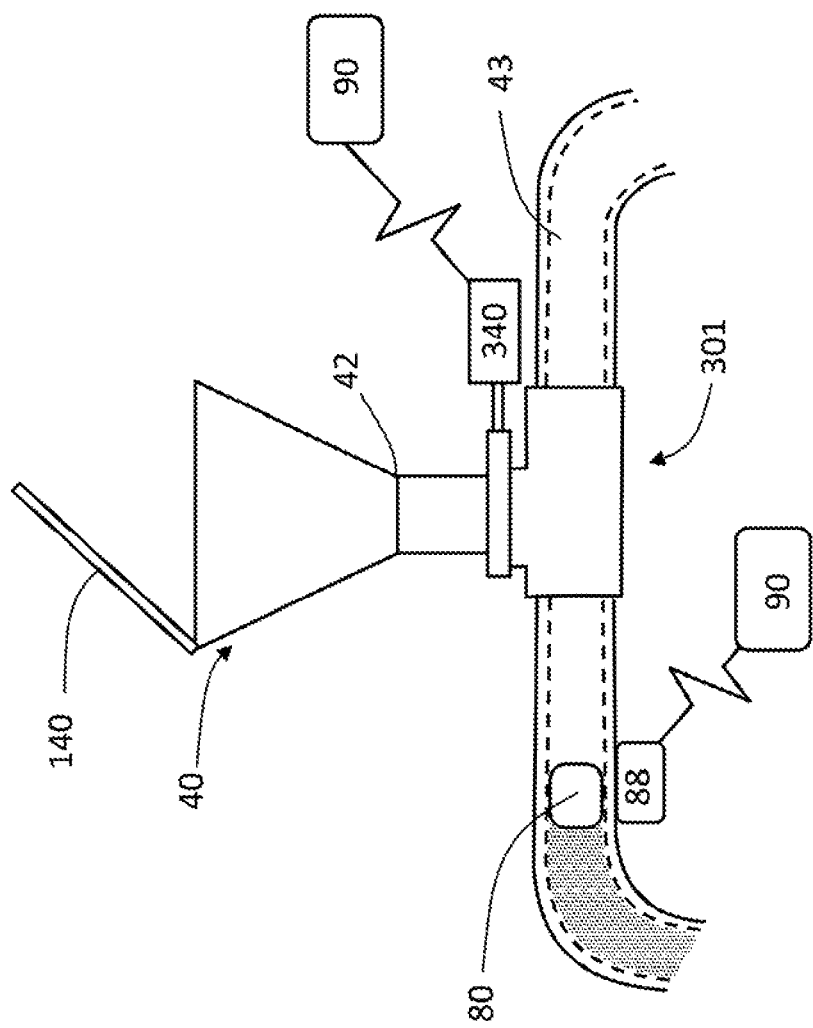
FIG. 23 shows a further embodiment of a side-opening valve having a waste-receiving piping section having a side port with an opening, and an axially-sliding plate that sealably closes the opening.

An alternative embodiment of a waste management system is shown in FIG. 23, in which a side-opening valve 301 has a waste-receiving piping section having a side port with a side opening, and an axially-sliding plate that sealably closes the side opening and isolates the interior of the waste-receiving piping section from the lower end of the toilet. An example of the side-opening valve 301 is described herein and illustrated in FIGS. 13-16, operated with an actuator 340. The side-opening valve 301 provides an unobstructed opening therethrough.

Figure 24:
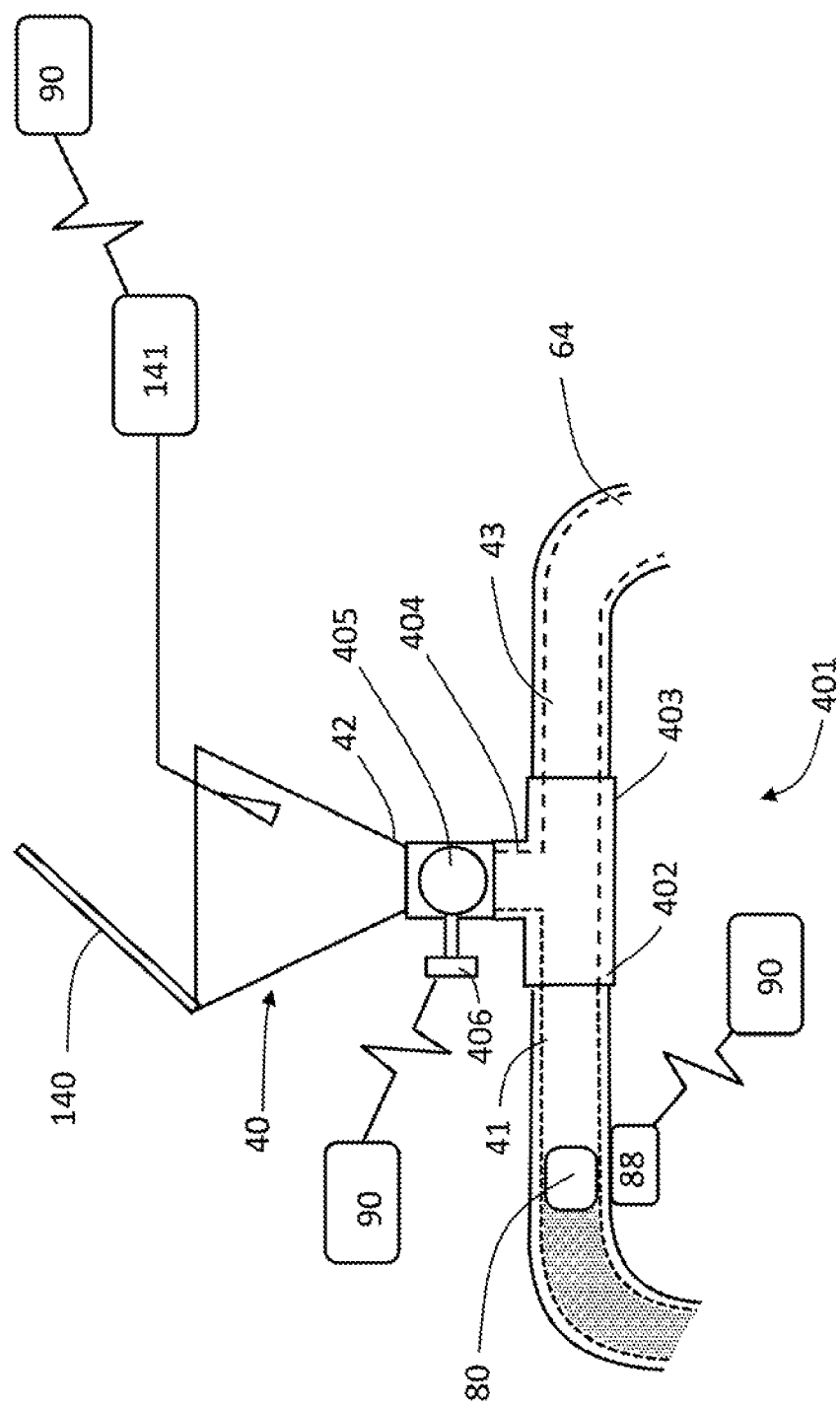
FIG. 24 shows an alternative embodiment that replaces the sleeve valve with a side-opening valve that consists of a conventional "T"-type waste-receiving piping section and a flow valve to connect the toilet to the "T"-type piping section.

Another alternative embodiment of a waste management system is shown in FIG. 24, in which the side-opening valve, shown as a sleeve valve 1 in the earlier embodiment, is replaced with a waste valve including a pipe section having an inlet end, and an outlet end, and a side entry port, and a side entry valve connected to the side entry port. The pipe section can comprise a conventional "T"-type waste-receiving piping section 401 and a conventional fluid valve 405 communicating between the lower end 42 of the toilet 40 and a side-entry leg 404 of the "T"-type waste-receiving piping section 401. The remaining two legs 402,403 of the "T"-type waste-receiving piping section 401 are connected with conventional plumbing fittings to the upstream 41 piping and downstream 43 piping. The handle 406 of the conventional fluid valve 405 can be actuated manually or by a mechanical or electro-mechanical actuator, as well known to persons skilled in the art, which can include without limitation a servo motor, or a pneumatic or hydraulic actuator, and a solenoid actuator, to turn the valve between a closed position and an open position. In a preferred embodiment, the conventional fluid valve 405 is configured to provide an unobstructed opening therethrough, and can include a ball valve.

The piping system also includes a pig installation and removal station 78 (FIG. 17) that provides a means to access the inside of the piping system to remove and install a pig as routine maintenance requires.

The piping system also includes the power and control systems 90. Power is typically mains electrical power to drive the motor of the fluid pump, any venting fan, and to operate various valves and solenoids. The control system can include a main microprocessor, software and programming, low voltage power, and circuits and connections to the devices and sensors in the system. An optional link to a network or the www or cloud can also be provided for electronic diagnoses, maintenance, and remote monitoring and system control. The system can also include a battery for backup power in case of a mains power outage or other emergency.

The toilet bowl 40 can also include a bowl cleaning system. An embodiment of a bowl cleaning system is illustrated in FIGS. 18 and 22, which can include a manifold ring 142, mounted at the top and inside of the toilet bowl 40 and having a one or more spray nozzles 143. The toilet manifold ring 142 is positioned at the top of the inside of the bowl 40, and includes a series of nozzle elements or spray means, including a plurality of holes in the manifold ring 142, disposed along the annular ring. The one or more nozzles are configured to dispense water or other aqueous solution onto the sidewalls and bottom of the bowl. After each use of the toilet, the system can spray 8-12 ounces of water under pressure through the series of nozzles to clean the toilet bowl 40. The waste management system can still be considered "waterless" because the cleaning water can be captured from shower water or laundry water and re-purposed for the toilet bowl cleaning.

The water for the bowl cleaning system can be provided by a water reuse system 141 that captures and pipes (144) repurposed water from other uses (for example, but not restricted to, showers, laundry water, bathtub water, and sinks). The capture and repurposed water for cleaning the toilet bowl can result in essentially zero fresh, potable water usage for the toilets. In general, the toilet 40 does not require a pool of standing water in the bottom bowl 42 as is present in conventional toilets.

The power and control system 90 can use standard program logic control (PLC) functionality to ensure the electronic components of the system operate in the proper sequence, and to perform system safety checks to avoid damage or injury that may result from the system executing a next step. The PLC can be located anywhere in the system where it can be reasonably accessed for programming and maintenance purposes.

Flush Cycle:

A flush cycle starts in an initial position shown in FIG. 17 with the sleeve valve 1 in a closed position, and the pig 80 has been withdrawn to a section of piping upstream from the sleeve valve. A user of the toilet 40 can raise a lid 140 which causes opening of the sleeve valve 1 and can activate the vent fan 76. After a user has completed use of the toilet, the waste W has fallen into the bowl 40 and down into the open sleeve valve 1. A bowl cleaning system can deliver the re-purposed water from a water reuse system 141 (or fresh water) through spray nozzle(s) 143, in an amount of 8-12 fluid ounces, thereby cleaning any waste on the inside walls of the bowl 40 as well as pushing down any toilet paper not already inside of the open sleeve valve 1.

The user then activates the flushing system by pushing a start button, or manually operating a lever or mechanical switch, or more preferably, for safety reasons, by closing the toilet lid 140. Activating by closing the toilet lid prevents a person from putting their hand down into the opening 42 of the toilet 40 and into the opening 12 of the valve 1 as it is closing. Upon activation by closing the toilet lid 140, the power and control systems 90 causes the sleeve valve 1 to close, by rotating the inner barrel 3 (to the position shown in FIGS. 4 and 5), thereby isolating the waste W within the sleeve valve 1 (FIG. 18). Then the venting fan 76 is shut off, and the vent valve 74 is closed.

Once the valve 1 is closed, the fluid pump 62 is turned on to pump pigging fluid L from the fluid container 52 into the sanitary waste piping 64, pushing the pipe pig 80 forward to pass through the closed sleeve valve and plunging the waste W and waste liquid ahead as the pig 80 is pushed toward the final destination at the terminal end 68 of the piping 64. When the presence of the pig 80 arriving at the terminal end 68 is detected by the stop sensor 86, the pump 62 is shut off, stopping the pig 80 abruptly, and depositing the waste W into the section S of the sewer or septic tank, as shown in FIG. 19. Backflow of waste W into the venting pipe 72 is prevented by the closed vent valve 74.

Upon controlled instruction, and as or after the vent valve 74 is opened, the discharge of the pump 62 can be reversed, or the piping arrangement around the pump can be configured, to pump the pigging fluid L from the piping system 60 back into the fluid container 52. The pig 80 is drawn backward under suction by the withdrawn pigging fluid L, while fresh air is drawn through the vent valve 74 in behind the retreating pig 80. The pig 80 travels in reverse back toward the pump 62 until it reaches the return sensor 88. Upon detecting the presence of the pig 80 at the terminal end 88, the pump 62 is shut off, halting the movement of the pig 80 (FIG. 20). The sleeve valve 1 remains closed to complete the flushing and cleaning cycle, and is ready for the next use.

The sequence of flushing and cleaning operations can be controlled by simple, common program logic controls. The system 50 can also be powered through a battery system to enable limited use during relatively short term power outages. During power outages, the battery can be used at least to open and close the sleeve valve 1. Alternatively the bowl cleaning system can also be run on battery power sufficient to move any waste and associated odors down into the sleeve valve 1. The pump 62 can also be configured be operate just sufficiently to move waste W out of the sleeve valve 1 and into the downstream piping 43.

A single waste management system 50 can handle multiple toilets positioned at different locations and in the same area, such as in a series. While a common fluid container and pumping system can be used, the pigging system can serve a series of plurality of toilets through a manifold system and automatic solenoid valves arranged on a the manifold to supply pigging fluid to each toilet as needed. Depending on the capacity and controls of the system, the multiple toilets can be flushed one at a time or in a sequence, or simultaneously. Depending upon the locations and vicinity of the multiple toilets, each individual toilet and sleeve valve can include an individual pipe pig, pipe pig sensors, vent line, valve and fan.

In one embodiment of a multiple toilet system, a discharge pipe of the pigging fluid pump connects to a pigging fluid supply manifold to supply pigging fluid to, or remove pigging fluid from, any one of the multiple toilets, with pigging fluid flow being controlled by a separate solenoid-controlled flow valve at outlet ports of the supply manifold. In another embodiment, each unique toilet and sleeve valve has a dedicated piping to a union pipe fitting (a "Y" or "cleanout" fitting) to enable a common discharge piping for the remaining distance to the sewer system. In another embodiment, where only one pipe pig can be pushed at a time, either by the supply pump or through to the shared segment of the pipe running to the sewer system, the pigging cycles for the multiple toilets can be sequence, which may result in a delay of the pigging of one of the toilets while another toilet is being pigged. In this circumstance, the controls can be configured to delay the pigging of a toilet, by completing the bowl cleaning step, closing the sleeve valve, and completing the pigging cycle when the pigging of the other toilet is completed.

I claim:
1. A side opening sleeve valve, including:
   a) an inner barrel comprising a cylindrical wall having an axis, and a single shaped opening through the wall that has a longer size along the axis of the inner barrel, and
   b) an outer barrel comprising a cylindrical wall having an axis, and a single shaped opening through the wall, that has a longer size along the axis of the outer barrel, where the inner barrel is disposed co-annularly and rotatably within the outer barrel between a first open position where the single shaped opening in the inner barrel overlaps with the single shaped opening in the outer barrel to form a side opening into the side-opening sleeve valve, and a second closed position where the single shaped opening of the inner barrel and the single shaped opening of the outer barrel do not overlap.
2. The side-opening sleeve valve according to claim 1 where the side opening in the first open position has an effective axial opening size and an effective lateral opening size, and a ratio of the effective axial opening size to the effective lateral opening size is at least about 2:1 and up to 20:1.
3. The side-opening sleeve valve according to claim 2 where the ratio is at least about 3:1.
4. The side-opening sleeve valve according to claim 3 where the ratio is up to about 6:1.
5. The side-opening sleeve valve according to claim 2 where the arc length of the single shaped opening of the inner barrel is less than 180 degrees of the circumference of the inner barrel.
6. The side-opening sleeve valve according to claim 2 where an inlet end and an outlet end of the outer barrel are configured for connection in fluid communication with an upstream pipe and a downstream pipe, respectively.

7. The side-opening sleeve valve according to claim 2 wherein the inner barrel has an unobstructed axial pathway passing between the inlet end and the outlet end.
8. The side-opening sleeve valve according to claim 6, further including an annular seal ring at both the inlet end and the outlet end, disposed between an outside surface of the inner barrel and an inner surface of the outer barrel.
9. The side-opening sleeve valve according to claim 6 where an inlet end and an outlet end of the outer barrel are configured for connection in fluid communication with an upstream pipe and a downstream pipe, respectively.
10. The side-opening sleeve valve according to claim 2 further including a sleeve seal layer disposed between the wall of the inner barrel and the wall of the outer barrel, the sleeve seal layer comprising a cylindrical sheet having an opening that registers with at least one of the opening of the inner barrel and the opening of the outer barrel, to seal between the inner and outer barrels at the periphery of the shaped opening in the outer barrel.
11. The side-opening sleeve valve according to claim 2, wherein the single shaped opening through the wall of the inner barrel is up to 90 degrees of a circumference of the inner barrel.
12. The side-opening sleeve valve according to claim 2, wherein the single shaped opening through the wall of the inner barrel and the single shaped opening through the wall of the outer barrel each have an arc length of from about 90 degrees to about 150 degrees.
13. The side-opening sleeve valve according to claim 2 for use in combination with a toilet having a bowl, wherein the side-opening sleeve is configured for isolating the toilet from waste discharge piping to which the side-opening sleeve valve is connected, wherein an open lower end of the bowl is sealingly mounted to the outer barrel of the side-opening sleeve valve and configured for passing a waste material from the bowl through the side opening of, and into, the sleeve valve.
14. The side-opening sleeve valve according to claim 2 further including a means for rotating the inner barrel relative to the outer barrel.
15. The side-opening sleeve valve according to claim 14 wherein the rotating means is a post extending from the cylindrical wall of the inner barrel, through a circumferential slot in the cylindrical wall of the outer barrel.
16. The side-opening sleeve valve according to claim 2 wherein the single shaped opening of the inner barrel and the single shaped opening of the outer barrel are rectangular and are aligned in the first open position.
17. The side-opening sleeve valve according to claim 2 wherein the single shaped opening of the inner barrel and the single shaped opening of the outer barrel are rectangular, and the axial length of the single shaped opening of the inner barrel is the same or longer than the axial length of the single shaped opening of the outer barrel.
18. The side-opening sleeve valve according to claim 7 wherein the unobstructed axial pathway has a uniform circular shape between the inlet end and the outlet end.

* * * * *